United States Patent
Sadiq et al.

(10) Patent No.: US 10,939,457 B2
(45) Date of Patent: Mar. 2, 2021

(54) BEAM DETERMINATION FOR WIRELESS COMMUNICATION

(71) Applicant: QUALCOMM Incorporated, San Diego, CA (US)

(72) Inventors: Bilal Sadiq, Basking Ridge, NJ (US); Juergen Cezanne, Ocean Township, NJ (US); Sony Akkarakaran, Poway, CA (US); Xiao Feng Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/268,297

(22) Filed: Feb. 5, 2019

(65) Prior Publication Data

US 2019/0254045 A1 Aug. 15, 2019

Related U.S. Application Data

(60) Provisional application No. 62/630,696, filed on Feb. 14, 2018.

(51) Int. Cl.
*H04W 72/12* (2009.01)
*H04W 72/04* (2009.01)
(Continued)

(52) U.S. Cl.
CPC ...... *H04W 72/1205* (2013.01); *H04B 7/0617* (2013.01); *H04B 7/08* (2013.01); *H04W 72/0446* (2013.01)

(58) Field of Classification Search
None
See application file for complete search history.

(56) References Cited

U.S. PATENT DOCUMENTS

| 2011/0117948 A1* | 5/2011 | Ishii | H04W 72/042 455/509 |
| 2019/0104549 A1* | 4/2019 | Deng | H04B 7/0617 |

(Continued)

OTHER PUBLICATIONS

Ericsson: "Remaining Details of Beam Management", 3GPP Draft; R1-1721366_ Remaining Details of Beam Management, 3rd Generation Partnership Project (3GPP), Mobile Competence Centre, 650, Route Des Lucioles; F-06921 Sophia-Antipolis Cedex, France, vol. RAN WG1,No. Reno, USA; Nov. 27, 2017-Dec. 1, 2017, Nov. 27, 2017 (Nov. 27, 2017), 16 Pages, XP051363826, Retrieved from the Internet: URL: http://www.3gpp.org/ftp/Meetings_3GPP_SYNC/ RAN1/Docs/ [retrieved on Nov. 27, 2017].

(Continued)

*Primary Examiner* — Otis L Thompson, Jr.
(74) *Attorney, Agent, or Firm* — Loza & Loza LLP

(57) ABSTRACT

The disclosure relates in some aspects to determining which beam parameters to use for wireless communication. For example, a wireless communication device may use one beam selection procedure for a non-persistent communication and another beam selection procedure for a semi-persistent communication. For the non-persistent communication, a transmission configuration signaled with control scheduling or a default transmission configuration may specify the beam configuration for the communication. For the semi-persistent communication, a recently used transmission configuration may specify the beam configuration for the communication. An apparatus may determine that a channel is persistently scheduled, determine a transmission configuration for a transmission based on a resource set associated with a transmission time, and receive information based on the determined transmission configuration. An apparatus may identify a resource set, acquire a transmission configuration of the resource set, and receive information on the channel based on the transmission configuration.

29 Claims, 26 Drawing Sheets

(51) Int. Cl.
  *H04B 7/06*  (2006.01)
  *H04B 7/08*  (2006.01)

(56) References Cited

U.S. PATENT DOCUMENTS

| | | | |
|---|---|---|---|
| 2019/0116608 A1* | 4/2019 | Kim | H04W 72/04 |
| 2019/0190582 A1* | 6/2019 | Guo | H04L 25/0226 |
| 2019/0230578 A1* | 7/2019 | Karaki | H04W 72/1242 |
| 2019/0239196 A1* | 8/2019 | Lee | H04W 72/0413 |
| 2019/0246395 A1* | 8/2019 | Huang | H04W 72/12 |
| 2019/0260524 A1* | 8/2019 | Nam | H04L 1/0047 |
| 2020/0014515 A1* | 1/2020 | Qin | H04L 5/00 |

OTHER PUBLICATIONS

International Search Report and Written Opinion—PCT/US2019/016829—ISA/EPO—dated Apr. 29, 2019.
ZTE., et al., "Details and Evaluation Results on Beam Indication", 3GPP Draft; R1-1719538_Details and Evaluation Results on Beam Indication. 3rd Generation Partnership Project (3GPP), Mobile Competence Centre, 650, Route Des Lucioles; F-06921 Sophia-Antipolis Cedex, France, vol. RAN WG1,No. Reno, USA; Nov. 27, 2017-Dec. 1, 2017, Nov. 18, 2017 (Nov. 18, 2017), 11 Pages, XP051369352, Retrieved from the Internet: URL: http://www.3gpp.org/ftp/tsg_ran/WG1_RL1/TSGR1_91/Docs/ [retrieved on Nov. 18, 2017], Sections 1 and 2.3.

* cited by examiner

BEAM DETERMINATION FOR WIRELESS COMMUNICATION

CROSS-REFERENCE TO RELATED APPLICATION(S)

This application claims priority to and the benefit of provisional patent application No. 62/630,696 filed in the U.S. Patent and Trademark Office on Feb. 14, 2018, the entire content of which is incorporated herein by reference.

INTRODUCTION

Various aspects described herein relate to wireless communication and, more particularly but not exclusively, to determining which beam parameters to use for wireless communication.

Some types of wireless communication devices use beamforming to provide a desired level of performance. One example of such a device is a wireless multiple-in-multiple-out (MIMO) system where a transmitting device (e.g., a base station) uses multiple antennas to send beamformed signals to a receiving device (e.g., a user equipment) which can have one or more antennas. Here, the transmitted beamformed signals may be adjusted in phase (and, optionally, amplitude) such that the resulting signal power is focused toward the receiving device. Another example of a device that may use beamforming is a millimeter wave (mmW) device that can send and receive beamformed signals at mmW frequencies (e.g., in the range of 30 GHz, 60 GHz, etc.).

Since beamformed communication may use relatively narrow beams, changes in the operating environment such a movement of a device, a change in channel conditions, interference from nearby devices, or the presence of a structure that blocks a beam may necessitate that the transmitting device and/or the receiving device switch to a different beam. Thus, there is a need for effective techniques for devices to determine which beam to use for communication.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a processing circuit and a receiver coupled to the processing circuit. The processing circuit is configured to: determine that a channel is persistently scheduled, and determine a transmission configuration for a transmission of information on the channel, wherein the determination of the transmission configuration is based on a resource set associated with a time of the transmission of information. The receiver is configured to: receive the information based on the determined transmission configuration.

In one aspect, the disclosure provides a method of communication for an apparatus. The method including: determining that a channel is persistently scheduled; determining a transmission configuration for a transmission of information on the channel, wherein the determination of the transmission configuration is based on a resource set associated with a time of the transmission of information; and receiving the information based on the determined transmission configuration.

In one aspect, the disclosure provides an apparatus configured for communication. The apparatus including: means for determining that a channel is persistently scheduled; means for determining a transmission configuration for a transmission of information on the channel, wherein the determination of the transmission configuration is based on a resource set associated with a time of the transmission of information; and means for receiving the information based on the determined transmission configuration.

In one aspect, the disclosure provides a non-transitory computer-readable medium storing computer-executable code, including code to: determine that a channel is persistently scheduled; determine a transmission configuration for a transmission of information on the channel, wherein the determination of the transmission configuration is based on a resource set associated with a time of the transmission of information; and receive the information based on the determined transmission configuration.

In one aspect, the disclosure provides an apparatus configured for communication that includes a processing circuit and a receiver coupled to the processing circuit. The processing circuit is configured to: identify a resource set, and acquire a transmission configuration of the resource set at an acquisition time that is based on a time of transmission of information on a channel. The receiver is configured to: receive the information on the channel based on the acquired transmission configuration.

In one aspect, the disclosure provides a method of communication for an apparatus. The method including: identifying a resource set; acquiring a transmission configuration of the resource set at an acquisition time that is based on a time of transmission of information on a channel; and receiving the information on the channel based on the acquired transmission configuration.

In one aspect, the disclosure provides an apparatus configured for communication. The apparatus including: means for identifying a resource set; means for acquiring a transmission configuration of the resource set at an acquisition time that is based on a time of transmission of information on a channel; and means for receiving the information on the channel based on the acquired transmission configuration.

In one aspect, the disclosure provides a non-transitory computer-readable medium storing computer-executable code, including code to: identify a resource set; acquire a transmission configuration of the resource set at an acquisition time that is based on a time of transmission of information on a channel; and receive the information on the channel based on the acquired transmission configuration.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
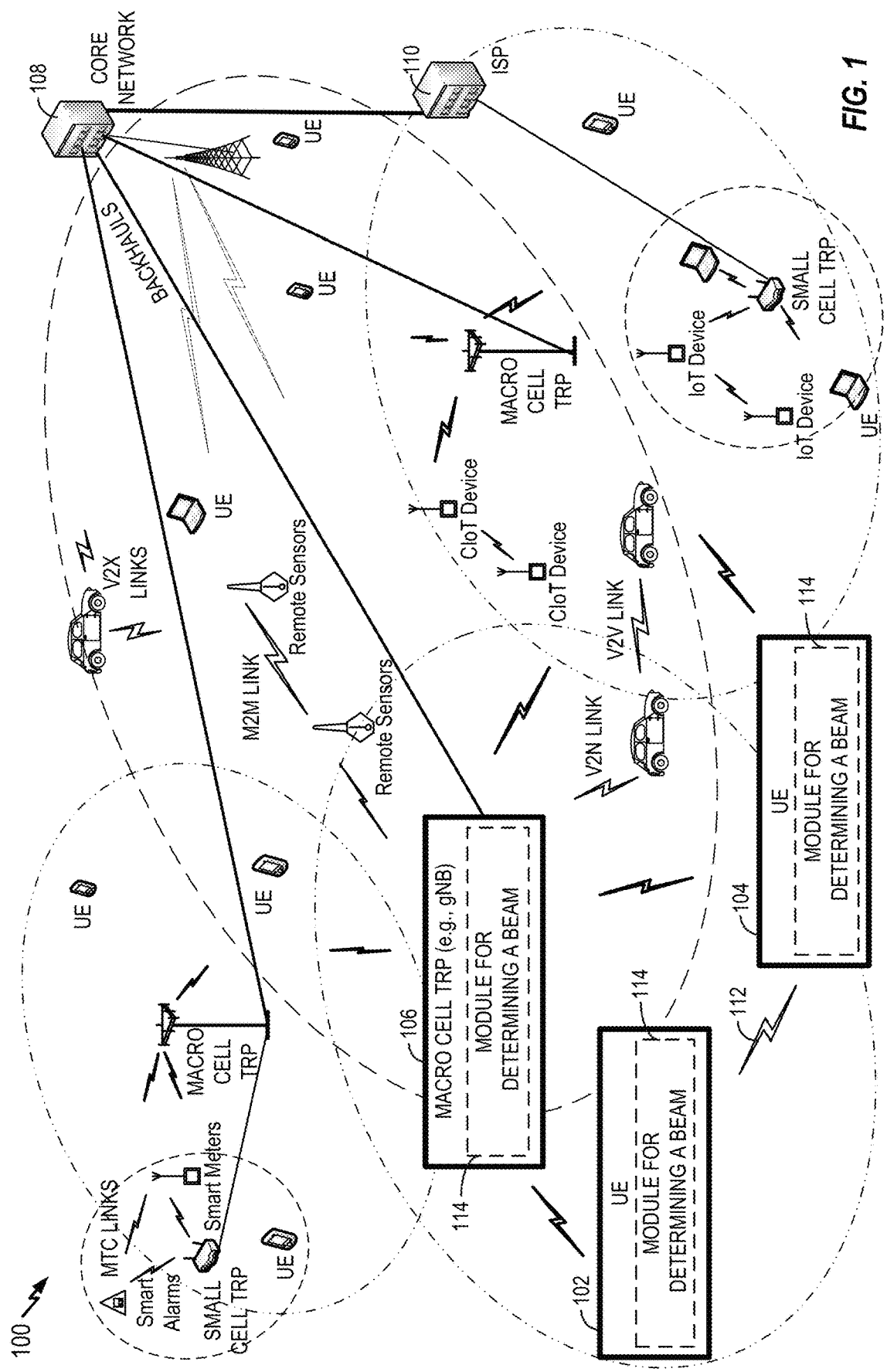
FIG. 1 is a block diagram illustrating an example communication system within which aspects of the disclosure may be implemented.

Various aspects of the disclosure relate to determining which beam parameters to use for wireless communication. For example, a wireless communication device may use one beam selection procedure for a non-persistent (e.g., non-periodic, one-time, etc.) communication and another beam selection procedure for a semi-persistent (e.g., periodic) communication. For the non-persistent communication, a transmission configuration signaled with control scheduling or a default transmission configuration may specify the beam configuration for the communication. For the semi-persistent communication, a recently used transmission configuration may specify the beam configuration for the communication.

As a more specific example, in a 3rd Generation Partnership Project (3GPP) system, the network may send Downlink Control Information (DCI) to a user equipment (UE) to schedule a downlink (DL) transmission (e.g., a Physical Downlink Shared Channel transmission) to the UE. In some cases, the DCI may include a Transmission Configuration Indication (TCI) that includes information about the beam that will be used for the transmission. If the DCI does include a TCI, the UE may use the beam specified by the TCI or a default beam. Otherwise, the UE may use the TCI state of the Control Resource Set (CORESET) that was used to receive the DCI. A CORESET is the time-frequency resource region where the UE monitors control messages (e.g., the physical downlink control channel (PDCCH)).

In some cases (e.g., for non-semi-persistent communication), a UE identifies the CORESET that was used to decode the DCI. In this case, the UE can read the TCI state of that CORESET at a time relative to the transmission time of PDSCH (e.g., the beginning of the PDSCH slot). Then, based on quasi co-location (QCL) information in the TCI, the UE is able to determine how to receive a beamformed transmission from a base station (e.g., a gNB). For example, the QCL information may enable the UE to determine how to receive a current transmission (e.g., PDSCH) based on parameters the UE used to receive a prior transmission (e.g., a prior CORESET).

In some cases, the DCI may specify semi-persistent scheduling (SPS). For example, the DCI may indicate that the DL transmission will occur at a certain periodicity. In the event the DCI specifies SPS, the UE may use the TCI state of a CORESET that is identified based on the time of the DL transmission. For example, the UE may identify the CORESET relative to the transmission time of the PDSCH (e.g., the nearest/latest CORESET). The UE can then read the TCI state of that CORESET at a time relative to the transmission time of PDSCH (e.g., the beginning of the PDSCH slot).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a transmit receive point (TRP) 106 using wireless communication resources managed by the TRP 106 and/or other network components (e.g., a core network 108, an internet service provider (ISP) 110, peer devices, and so on). In some implementations, one or more of the components of the system 100 may communicate with each other directedly via a device-to-device (D2D) link 112 or some other similar type of direct link.

Communication of information between two or more of the components of the system 100 may involve sending downlink information or the like. For example, the TRP 106 may send downlink information to the UE 102 or the UE 104. In accordance with the teachings herein, one or more of the TRP 106, the UE 102, the UE 104, or some other component of the system 100 may include a module for determining a beam 114.

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, vehicle-to-anything (V2X) links, and cellular V2X (CV2X) links Network-to-device links may include, without limitation, uplinks (or reverse links), downlinks (or forward links), and vehicle-to-network (V2N) links Semi-Persistently Scheduled Communication A base station (BS) can activate an SPS PDSCH allocation using an SPS DCI, whereby the SPS PDSCH recurs until it is released. Thus, the BS can conduct multiple transmissions without the overhead of recurring DCI transmissions.

During the course of the SPS PDSCH transmissions, the suitable beam for communication may change. For example, the initially used beam may entirely fail and/or a better beam may be identified. The disclosure relates in some aspects to dynamically determining which beam to use for an SPS PDSCH.

Transmission Configuration Indication

The DCI may include a TCI. This can be indicated, for example, by a TCI-PresentInDCI flag in the UE configuration.

A TCI state associated with a transmission/channel provides Quasi Co-Location (QCL) information about the antenna ports a BS used for the transmission. This QCL information may therefore include information indicative of the beam the UE is to use to decode the transmission.

Figure 2:
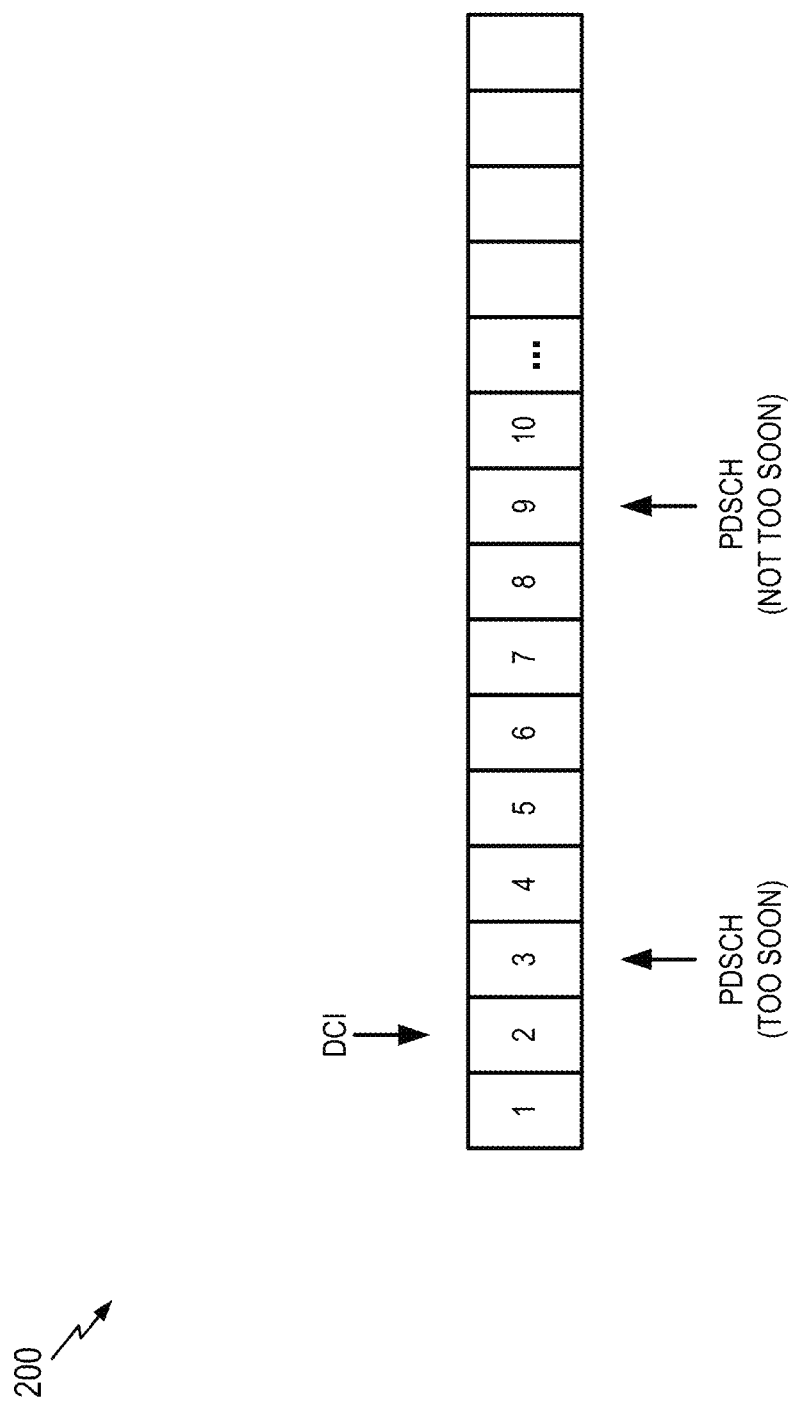
FIG. 2 is a timing diagram illustrating examples of physical downlink shared channel (PDSCH) communication.

An example of how the beam for non-SPS (e.g., one-shot) PDSCH may be determined based on whether PDSCH occurs "too soon" after the DCI follows. Examples of a "too soon" PDSCH and a PDSCH that is not "too soon" are shown in FIG. 2.

If PDSCH occurs "too soon" after the DCI, then a default beam is used for the PDSCH (e.g., the DCI in slot 2 indicates that the PDSCH will follow in slot 3). Here, "too soon" means that the time gap between DCI and PDSCH is less than a specified duration (e.g., Threshold-Sched-Offset). This duration may be 1 slot, 2 slots, or some other period of time.

The default beam is the beam of a uniquely identified CORESET occurring in the vicinity of the PDSCH. Specifically, this refers to the lowest CORESET-ID in the latest slot in which one or more CORESETs are configured for the UE.

If PDSCH occurs a sufficient amount of time after the DCI (i.e., the PDSCH does not occur "too soon"), there are two possibilities for determining the PDSCH beam. An example of this is shown in FIG. 2 where the DCI in slot 2 may indicate that the PDSCH will follow in slot 9.

First, if TCI-PresentInDCI is set to 'disabled' in the UE configuration, the beam of the PDSCH is the same as the beam of the CORESET in which the DCI was decoded. This CORESET may be referred to herein as the 'scheduling CORESET' of the PDSCH at hand.

If TCI-PresentInDCI is set to 'enabled' in the UE configuration, the beam ID of the PDSCH beam is the one indicated in the DCI.

Beam Determination

Figure 3:
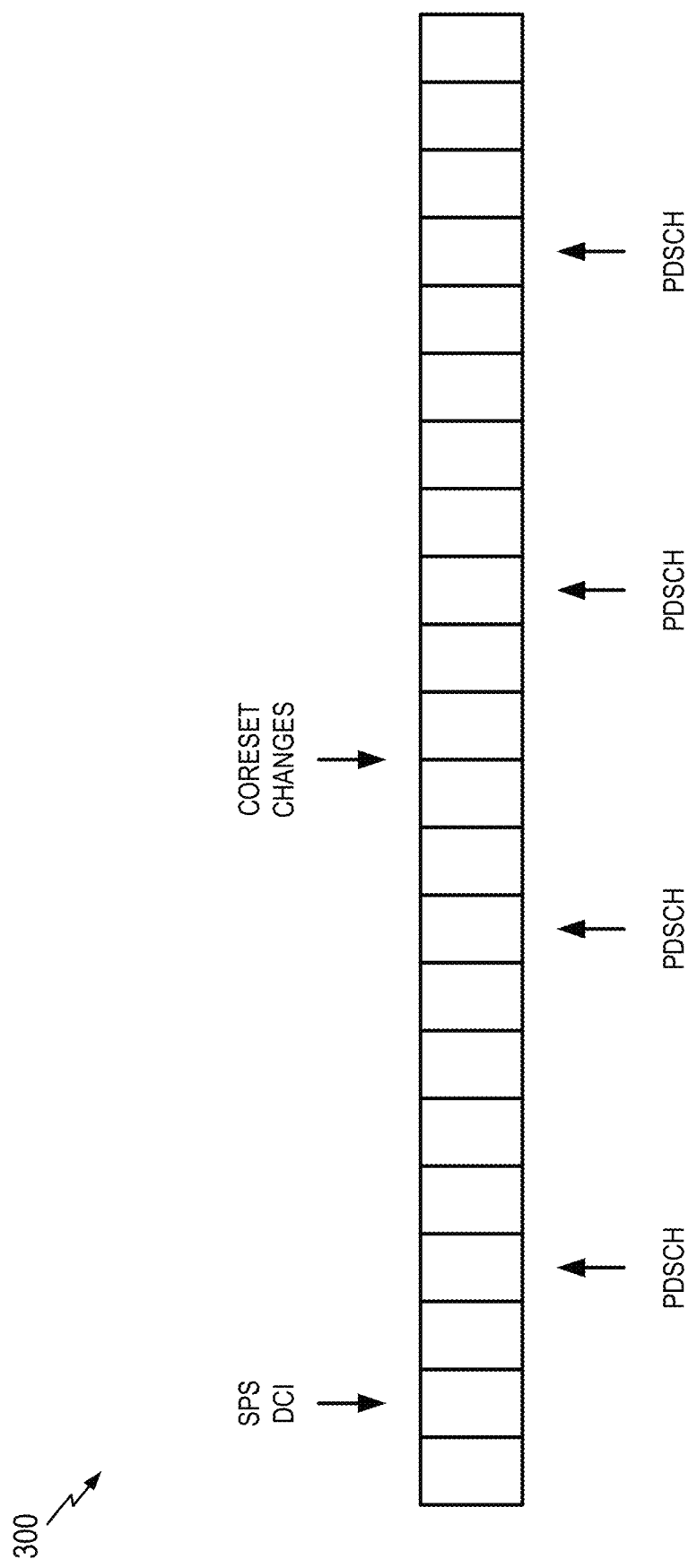
FIG. 3 is a timing diagram illustrating an example of semi-persistent scheduling (SPS) PDSCH communication in accordance with some aspects of the disclosure.

As shown in FIG. 3, the TCI state of the CORESET can change between the DCI transmission and an PDSCH transmission. For example, a gNB can change the TCI state of a CORESET from TCI state ID 3 to TCI state ID 4, or even change the content of the TCI state referred to by TCI state ID 3.

This scenario is even more likely to occur if the PDSCH is an SPS PDSCH. Thus, the TCI state of the DCI might not be the best TCI state to use.

In accordance with the teachings herein, if the PDSCH is an SPS PDSCH (e.g., scheduled by an SPS DCI), the TCI state of the PDSCH may be based on the TCI state of a CORESET "at the time of the transmission of the PDSCH." Determining the TCI state in this manner may enable a communication apparatus (e.g., a UE) to more efficiently and/or more effectively receive information (e.g., through the use of a TCI that provides better reception than a previously used or other TCI and/or by enabling the apparatus to more easily determine the TCI).

Here, "at the time of PDSCH transmission" may mean, for example, at the beginning of the PDSCH transmission, at the beginning of the slot of the PDSCH transmission, or at a slot that is prior to the slot of the PDSCH transmission by a predetermined time gap. That is, the time is tied to the transmission of the PDSCH, not the transmission of the DCI. Alternatively, the TCI state of the CORESET can be obtained from the most recent transmission time of the CORESET relative to the transmission time of the PDSCH (which could be the end of the slot carrying the PDSCH, the end of the PDSCH transmission, or any of the other time reference points set forth above).

If the PDSCH occurs too soon after the DCI (as discussed above), the CORESET to be used is the CORESET with the lowest CORESET-ID in the latest slot in which one or more CORESETs are configured for the UE. The "latest slots" means the slot of the PDSCH transmission and the slots preceding the PDSCH transmission.

For the case where a slot includes different CORESETs in different OFDM symbols, a more general tie breaking rule (e.g., instead of the "lowest CORESET-ID") can be the earlier or the latest in time within the slot. That is, the one nearest or causally nearest in time to the PDSCH.

If PDSCH occurs a sufficient period of time after the DCI, the CORESET is the 'scheduling' CORESET (i.e., the one in which the DCI scheduling the PDSCH was received).

If TCI-PresentInDCI is set to 'enabled' for a non-SPS scenario, the TCI state of non-SPS PDSCH is determined based on TCI state indicated in DCI.

If TCI-PresentInDCI is set to 'enabled' for an SPS scenario, the TCI state of SPS PDSCH is determined based on the TCI state of a CORESET at the time of the transmission of the PDSCH as discussed above. In this case, the TCI state indication bits might not be used for SPS DCI. Consequently, these bits could be set to predetermined fixed values to validate the DCI as SPS DCI.

Ongoing SPS Transmissions

For an already activated/ongoing SPS PDSCH transmissions, the TCI state of subsequent SPS PDSCH transmissions may be based on: the TCI state indicated by the BS in a MAC-CE, the TCI state indicated by the SPS modification DCI, or the TCI state indicated by the latest HARQ re-transmission of the SPS PDSCH.

In the case of an SPS modification DCI, the TCI state may be determined from the TCI state indicated in the SPS modification DCI or from the TCI state of the CORESET in which the SPS modification DCI was received.

The DCI may be taken as an SPS modification DCI if SPS PDSCH is activated (and not released) and the DCI schedules a PDSCH overlapping in time with the SPS PDSCH or occurring the same slot as the slot of the SPS PDSCH, on the same carrier. In addition, the DCI may be required to have to same HARQ process ID as that of the coinciding SPS PDSCH.

Overriding Transmissions

An SPS-PDSCH transmission may be overridden by another overlapping PDSCH transmission, e.g., a dynamically scheduled PDSCH transmission. If the time gap between the overriding PDSCH and its DCI is too short, e.g., smaller than a threshold, then the TCI state of the overriding PDSCH is adopted from the SPS-PDSCH transmission being overridden. An overriding PDSCH is a PDSCH that overlaps with an SPS-PDSCH transmission. For example, an overriding PDSCH may be transmitted in the same slot as the SPS-PDSCH transmission or may be transmitted on time-frequency resources that at least partially overlap with the time-frequency resources of the SPS-PDSCH transmission.

Uplink SPS Transmissions

For an SPS Physical Uplink Shared Channel (PUSCH) transmission, the beam can be based on the beam of a recent CSI-RS transmission. That is, the gNB receive beam and the UE transmit beam are both based on the CSI-RS. This includes the case where the SPS PUSCH beam is based on a recent SRS beam which, in turn, is based on the CSI-RS.

Example Communication Components

Figure 4:
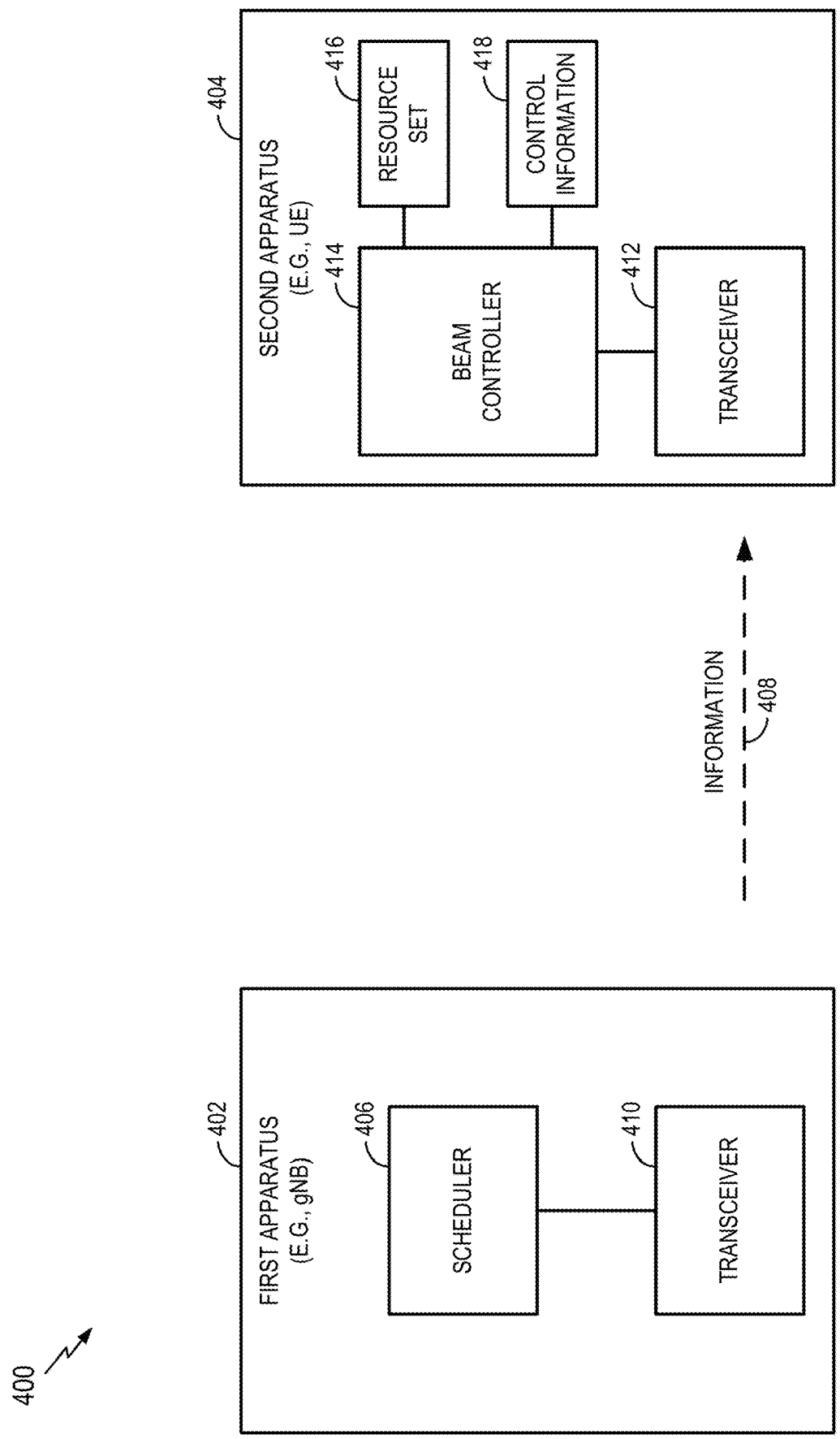
FIG. 4 is a block diagram illustrating an example communication system where an apparatus determines which beam to use in accordance with some aspects of the disclosure.

FIG. 4 is a schematic illustration of a wireless communication system 400 that incorporates the teachings herein to more effectively determine the transmit power to be used for sending messages (e.g., data, control information, etc.). The wireless communication system 400 includes a first apparatus 402 (e.g., a wireless communication device) and a second apparatus 404 (e.g., a wireless communication device), and potentially other apparatuses (not shown). In some implementations, the first apparatus 402 may correspond to the TRP 106 (e.g., a gNode B (gNB), a transmit receive point, an eNode B, etc.) or some other component of FIG. 1. In some implementations, the second apparatus 404 may correspond to the UE 102, the UE 104, or some other component of FIG. 1.

The first apparatus 402 includes a scheduler 406 for generating a schedule for communicating with the second apparatus 404. To this end, the first apparatus 402 may send information 408 such as control information (e.g., DCI), resource sets (e.g., CORESETs), and data (e.g., PDSCH) to the second apparatus 404 via a transceiver 410. The second apparatus 404 includes a transceiver 412 for receiving the information 408 and a beam controller 414 for determining which beam the transceiver 412 is to use for communication with the first apparatus 402. In accordance with the teachings here, the beam determination may be based on a resource set 416 and/or control information 418 received from the first apparatus 402.

First Example Operations

Figure 5:
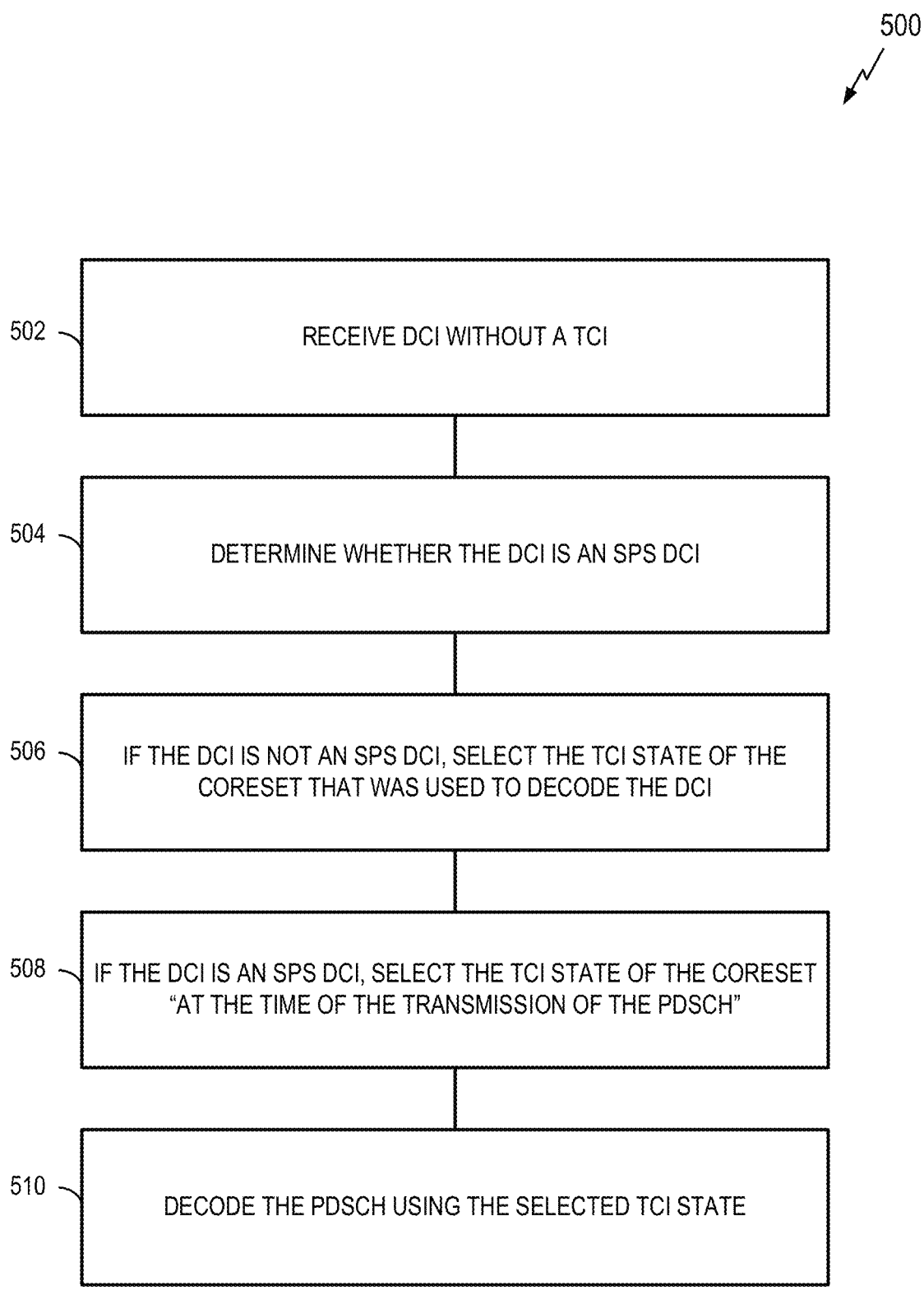
FIG. 5 is a flowchart illustrating an example of a process for PDSCH communication where Downlink Control Information (DCI) does not include a Transmission Configuration Indication (TCI) in accordance with some aspects of the disclosure.

FIG. 5 illustrates a process 500 for communication in accordance with some aspects of the disclosure. The process 500 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 500 may be implemented by any suitable apparatus capable of supporting communication-related operations.

At block 502, an apparatus (e.g., a UE) receives DCI without a TCI.

At block 504, the apparatus determines whether the DCI is an SPS DCI.

At block 506, if the DCI is not an SPS DCI, the apparatus selects the TCI state of the CORESET that was used to decode the DCI.

At block 508, if the DCI is an SPS DCI, the apparatus selects the TCI state of the CORESET "at the time of the transmission of the PDSCH."

At block 510, the apparatus decodes the PDSCH using the TCI state selected at block 506 or block 508.

In some aspects, a process in accordance with the teachings herein may include any combination of the operations of FIG. 5.

Second Example Operations

Figure 6:
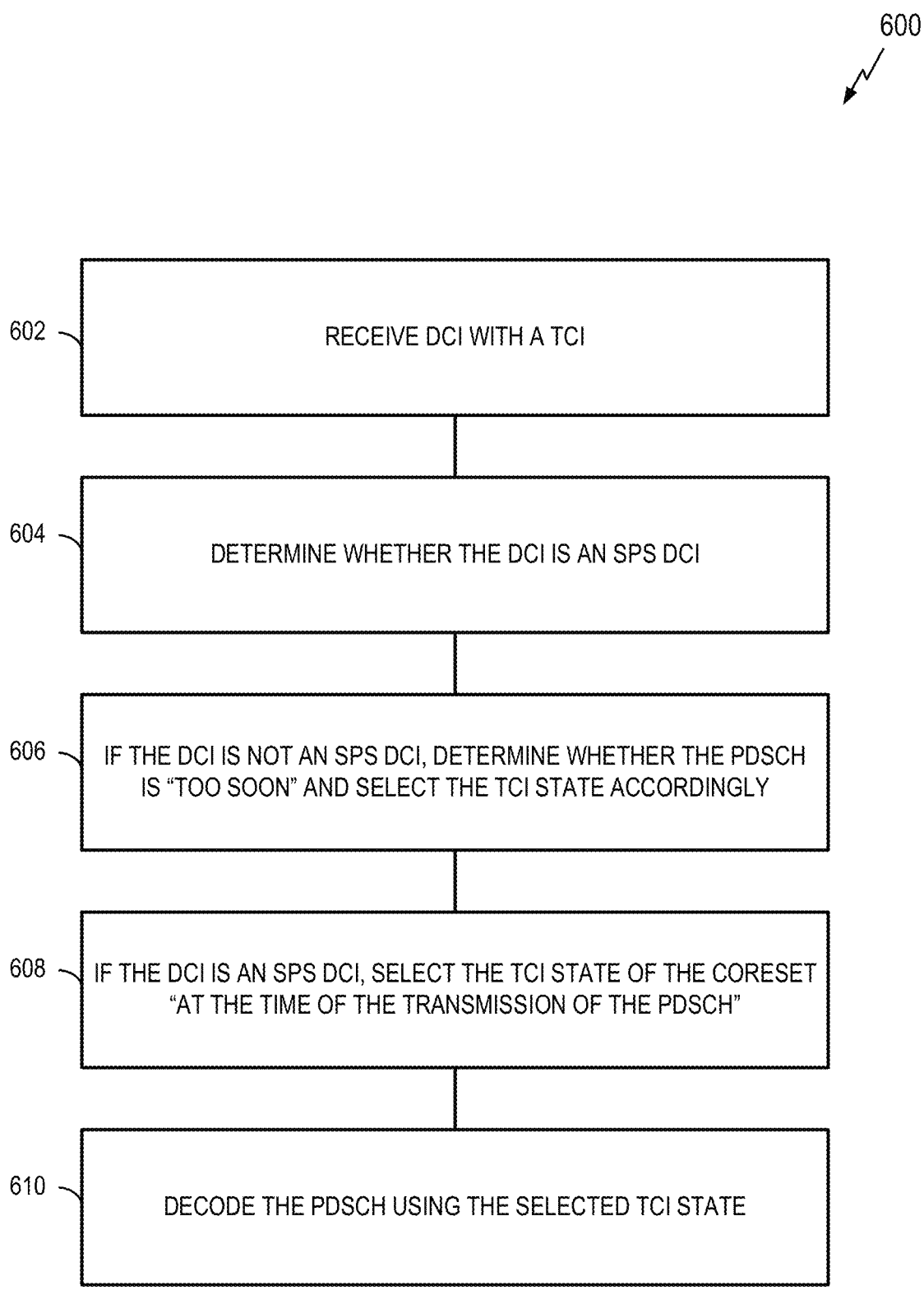
FIG. 6 is a flowchart illustrating an example of a process for PDSCH communication where the DCI includes a TCI in accordance with some aspects of the disclosure.

FIG. 6 illustrates a process 600 for communication in accordance with some aspects of the disclosure. The process 600 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 600 may be implemented by any suitable apparatus capable of supporting communication-related operations.

At block 602, an apparatus (e.g., a UE) receives DCI with a TCI.

At block 604, the apparatus the apparatus determines whether the DCI is an SPS DCI.

At block 606, if the DCI is not an SPS DCI, the apparatus determines whether the PDSCH is "too soon." If the PDSCH is "too soon," the apparatus selects the default beam (e.g., selects the TCI state of the CORSET occurring in the vicinity of the PDSCH). Otherwise, the apparatus selects the TCI state indicated in the SPI.

At block 608, if the DCI is an SPS DCI, the apparatus selects the TCI state of the CORESET "at the time of the transmission of the PDSCH."

At block 610, the apparatus decodes the PDSCH using the TCI state selected at block 606 or block 608.

In some aspects, a process in accordance with the teachings herein may include any combination of the operations of FIG. 6.

Third Example Operations

Figure 7:
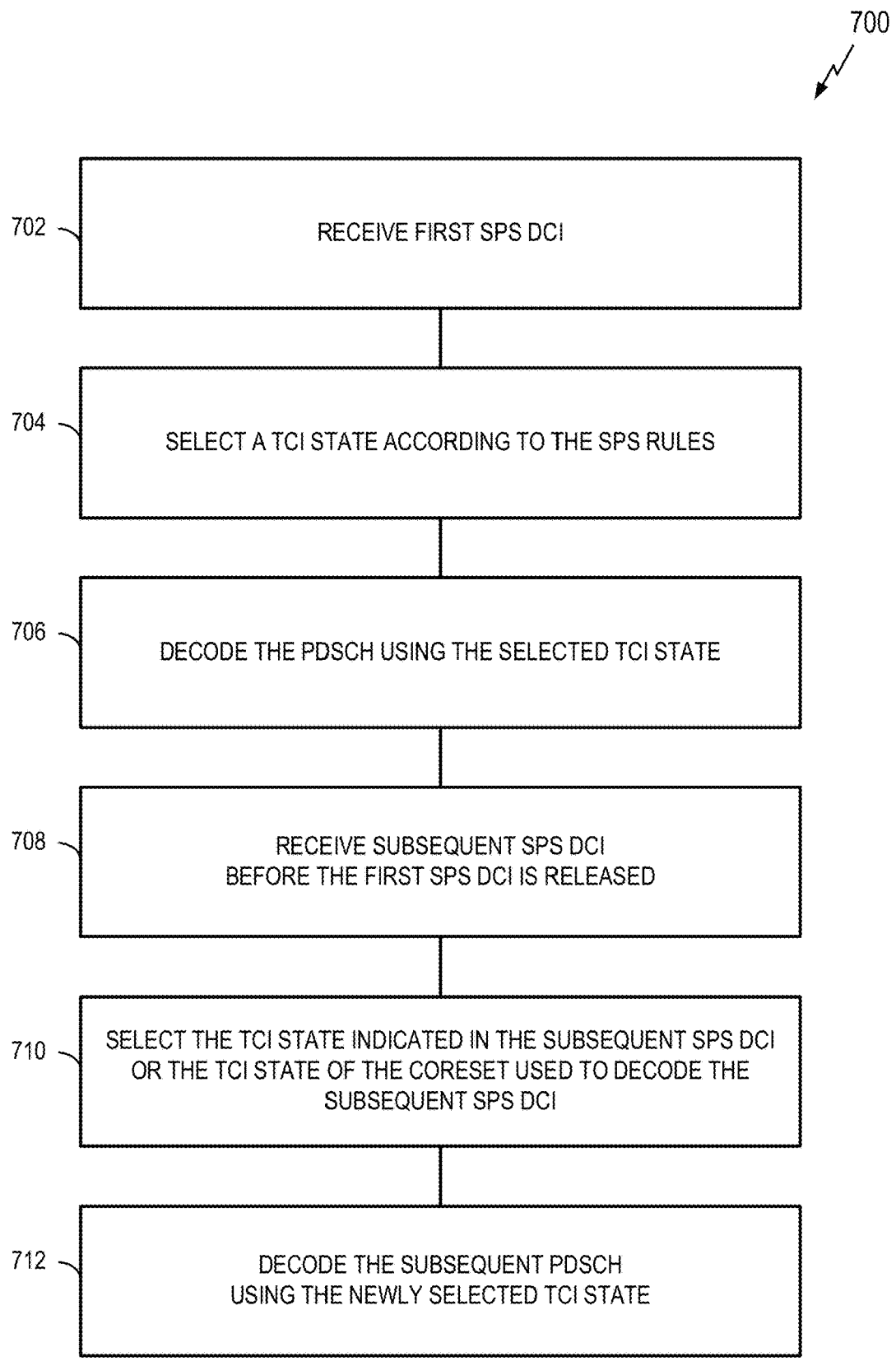
FIG. 7 is a flowchart illustrating an example of a process for SPS PDSCH communication in accordance with some aspects of the disclosure.

FIG. 7 illustrates a process 700 for communication in accordance with some aspects of the disclosure. The process 700 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 700 may be implemented by any suitable apparatus capable of supporting communication-related operations.

At block 702, an apparatus (e.g., a UE) receives a first SPS DCI.

At block 704, the apparatus selects a TCI state according to the SPS rules discussed above.

At block 706, the apparatus decodes a PDSCH using the TCI state selected at block 704.

At block 708, the apparatus receives a subsequent SPS DCI (an SPS modification DCI) before the first SPS DCI is released.

At block 710, the apparatus selects the TCI state indicated in the subsequent SPS DCI or the TCI state of the CORESET used to decode the subsequent SPS DCI.

At block 712, the apparatus decodes a subsequent PDSCH using the TCI state selected at block 710.

In some aspects, a process in accordance with the teachings herein may include any combination of the operations of FIG. 7.

Example Communication Apparatus

Figure 8:
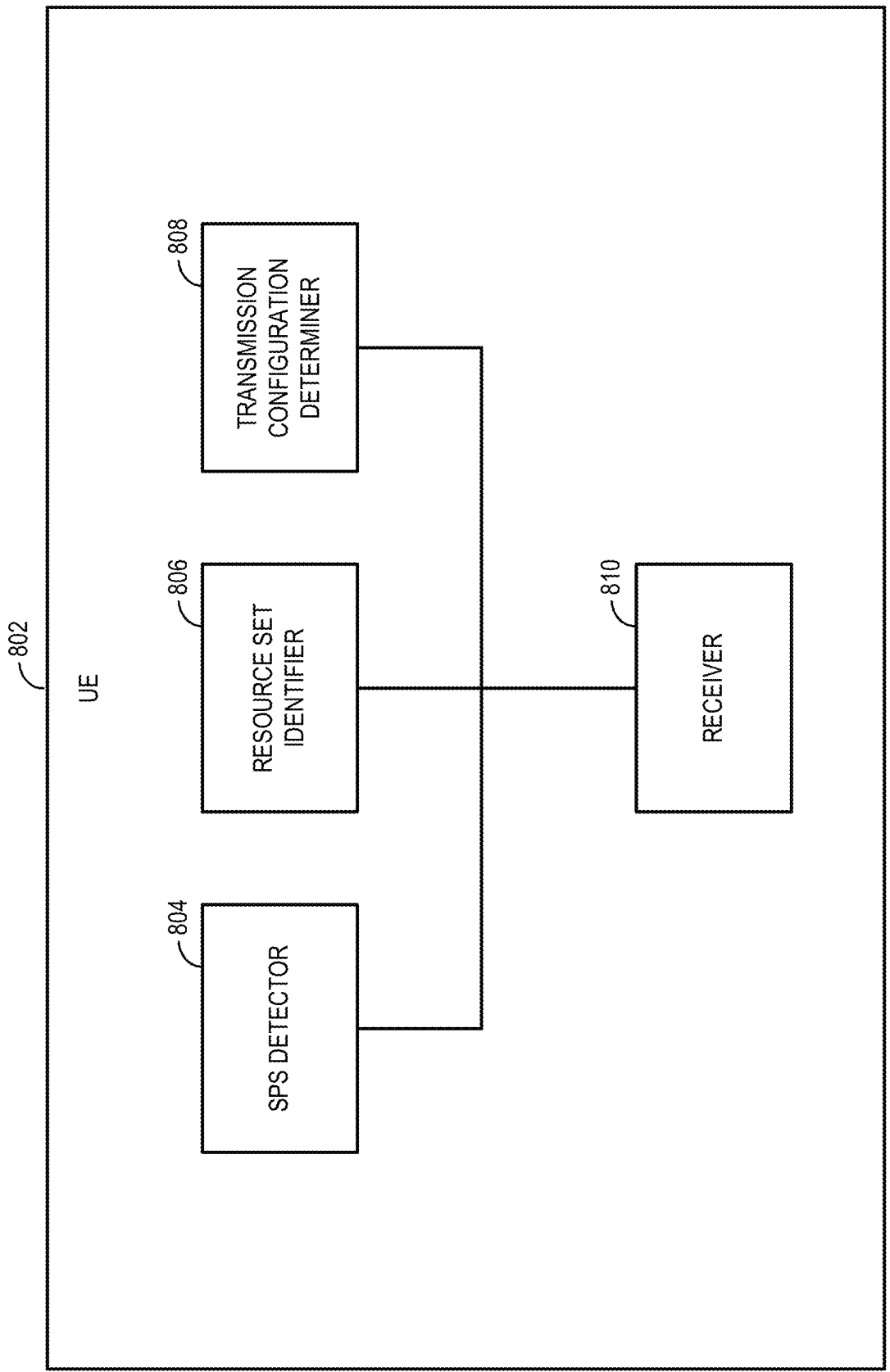
FIG. 8 is a block diagram illustrating an example apparatus that determines transmission configuration information and/or receives information according to the transmission configuration information in accordance with some aspects of the disclosure.

FIG. 8 is an example of a wireless communication apparatus (e.g., a UE) 802 that incorporates one or more of the teachings herein. In some implementations, the apparatus 802 may correspond to the UE 102, the UE 104, or some other component of FIG. 1.

The apparatus 802 includes an SPS detector 804 configured to determine whether traffic (e.g., a PDSCH) is schedule on a semi-persistent basis. The apparatus 802 includes a resource set identifier 806 configured to identify a resource set for determining transmission configuration information to be used receive the traffic (e.g., a PDSCH). The apparatus 802 includes a transmission configuration identifier configured to determine the transmission configuration information to be used receive the traffic (e.g., a PDSCH). The apparatus 802 includes a receiver 810 configured to receive information (e.g., a DCI, a PDSCH, etc.).

Fourth Example Operations

Figure 9:
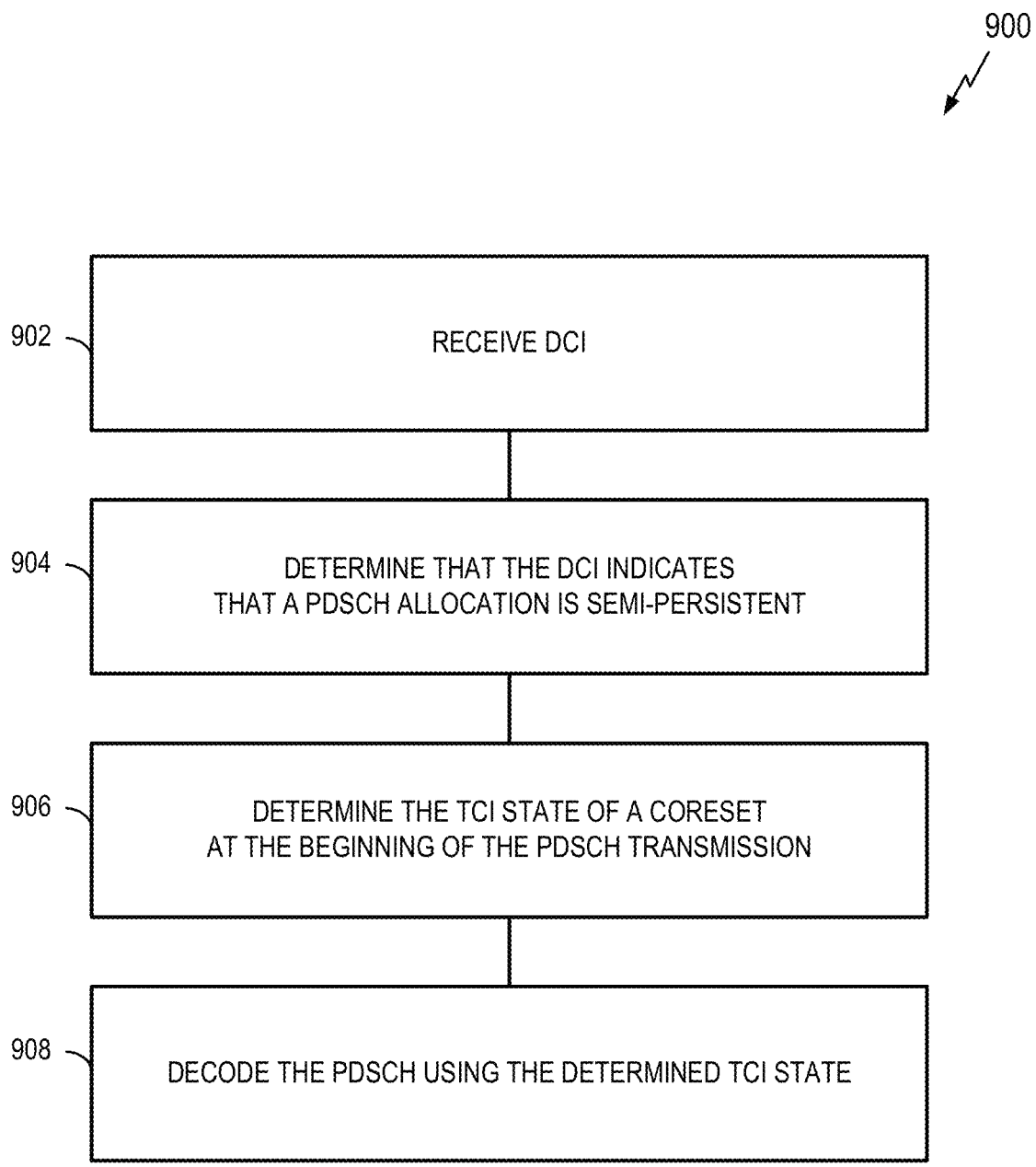
FIG. 9 is a flowchart illustrating an example of a process for decoding a PDSCH based on a TCI state of a Control Resource Set (CORESET) at the beginning of a transmission in accordance with some aspects of the disclosure.

FIG. 9 illustrates a process 900 for communication in accordance with some aspects of the disclosure. The process 900 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 900 may be implemented by any suitable apparatus capable of supporting communication-related operations.

At block 902, an apparatus (e.g., a UE) receives DCI.

At block 904, the apparatus determines that the DCI indicates that a PDSCH allocation is semi-persistent.

At block 906, the apparatus determines the TCI state of a CORESET at the beginning of the PDSCH transmission.

At block 908, the apparatus decodes the PDSCH using the determined TCI state.

In some aspects, a process in accordance with the teachings herein may include any combination of the operations of FIG. 9.

Fifth Example Operations

Figure 10:
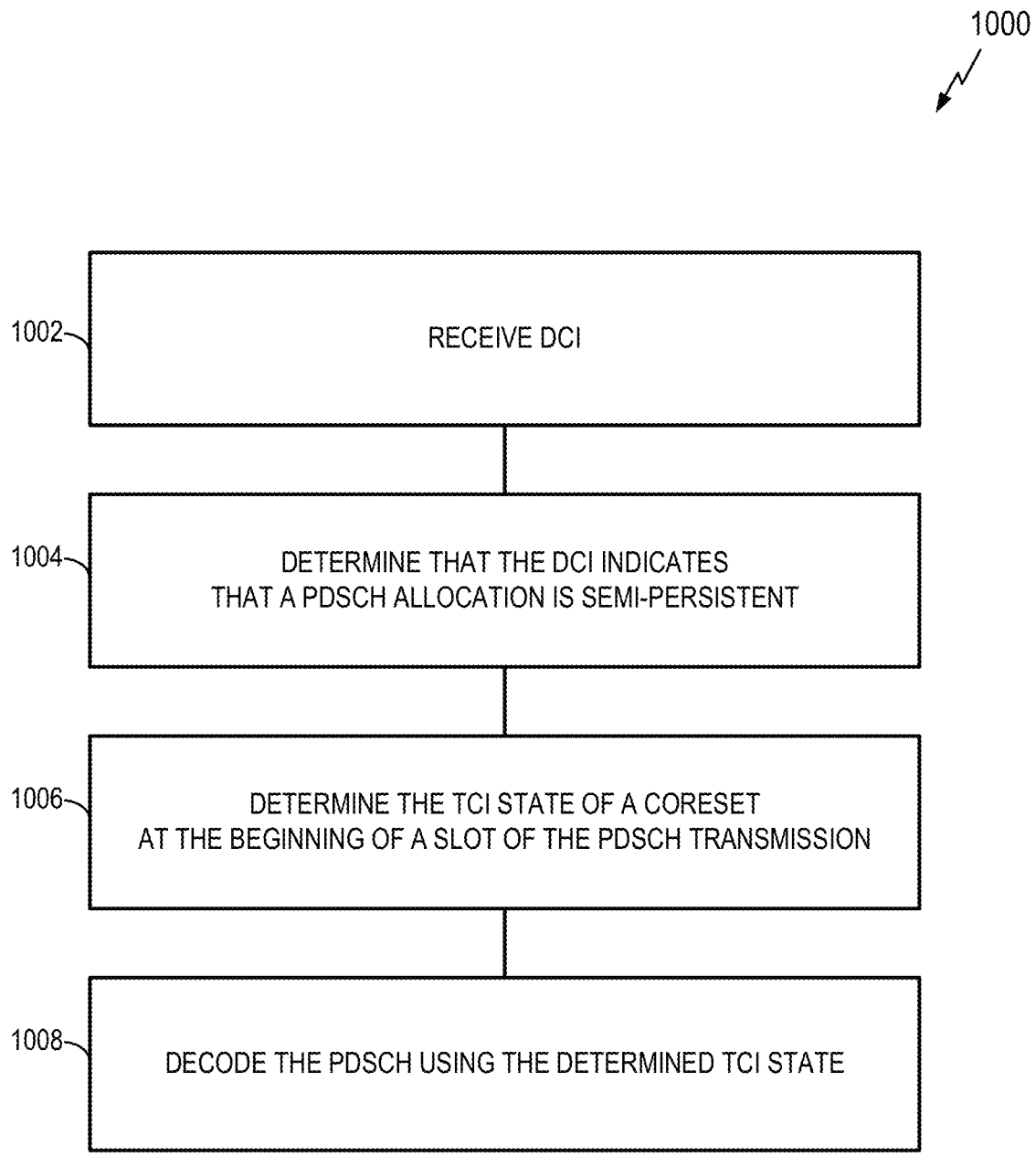
FIG. 10 is a flowchart illustrating an example of a process for decoding a PDSCH based on a TCI state of a CORESET at the beginning of a slot in accordance with some aspects of the disclosure.

FIG. 10 illustrates a process 1000 for communication in accordance with some aspects of the disclosure. The process 1000 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 1000 may be implemented by any suitable apparatus capable of supporting communication-related operations.

At block 1002, an apparatus (e.g., a UE) receives DCI.

At block 1004, the apparatus determines that the DCI indicates that a PDSCH allocation is semi-persistent.

At block 1006, the apparatus determines the TCI state of a CORESET at the beginning of a slot of the PDSCH transmission.

At block 1008, the apparatus decodes the PDSCH using the determined TCI state.

In some aspects, a process in accordance with the teachings herein may include any combination of the operations of FIG. 10.

Sixth Example Operations

Figure 11:
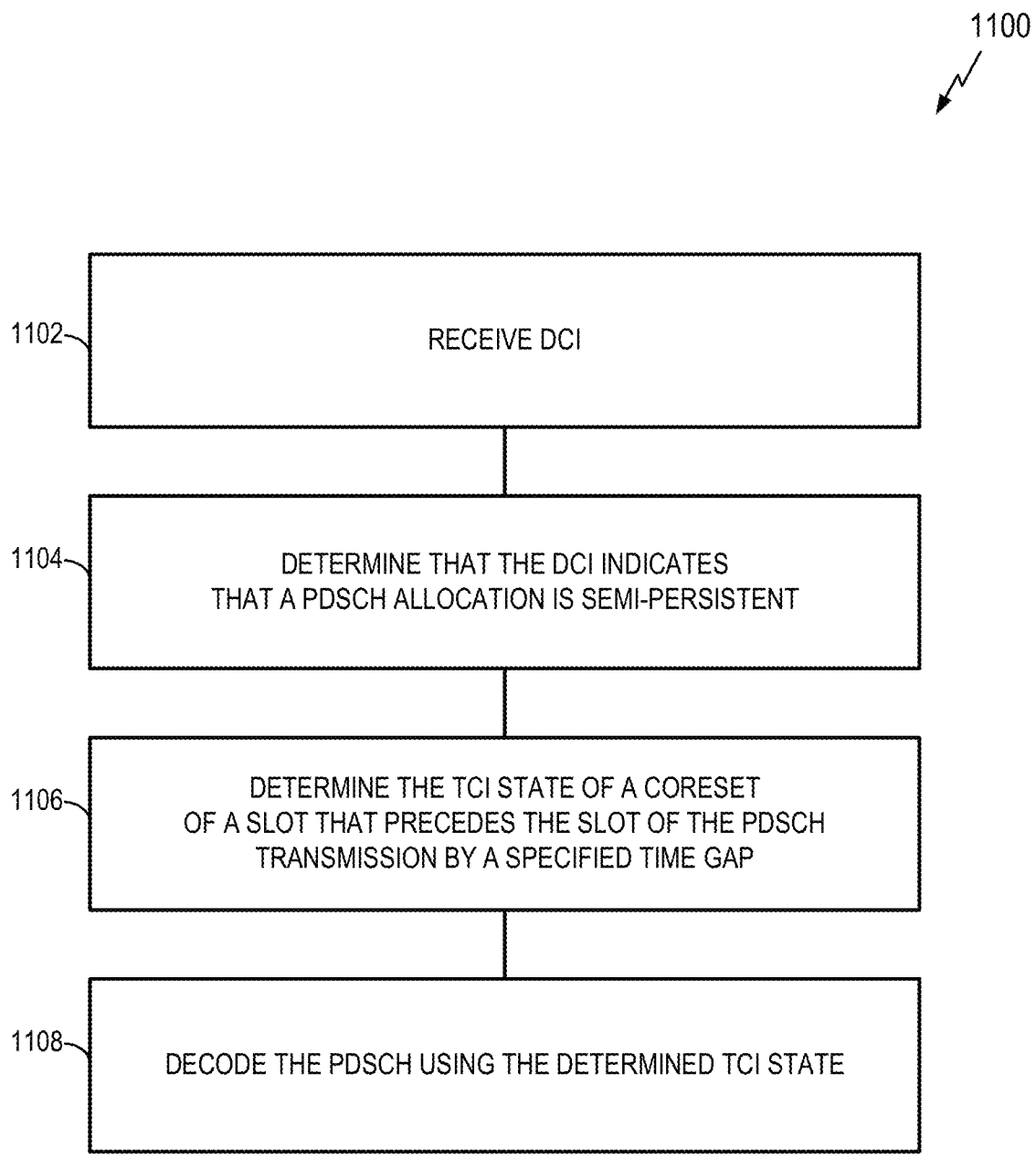
FIG. 11 is a flowchart illustrating an example of a process for decoding a PDSCH based on a TCI state of a CORESET of a slot in accordance with some aspects of the disclosure.

FIG. 11 illustrates a process 1100 for communication in accordance with some aspects of the disclosure. The process 1100 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 1100 may be implemented by any suitable apparatus capable of supporting communication-related operations.

At block 1102, an apparatus (e.g., a UE) receives DCI.

At block 1104, the apparatus determines that the DCI indicates that a PDSCH allocation is semi-persistent.

At block 1106, the apparatus determines the TCI state of a CORESET of a slot that precedes the slot of the PDSCH transmission by a specified time gap.

At block 1108, the apparatus decodes the PDSCH using the determined TCI state.

In some aspects, a process in accordance with the teachings herein may include any combination of the operations of FIG. 11.

Seventh Example Operations

Figure 12:
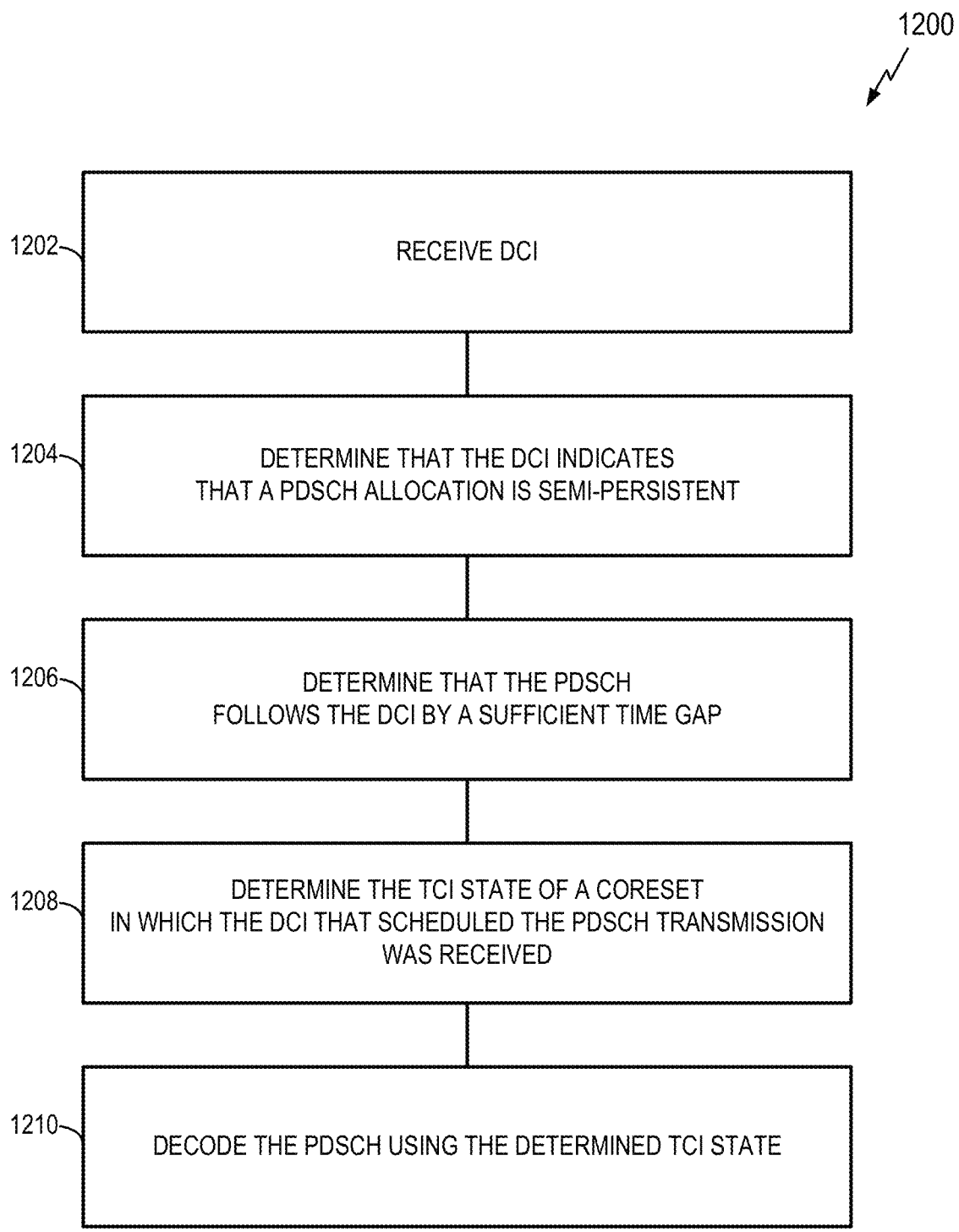
FIG. 12 is a flowchart illustrating an example of a process for decoding a PDSCH based on a TCI state of a CORESET for a DCI in accordance with some aspects of the disclosure.

FIG. 12 illustrates a process 1200 for communication in accordance with some aspects of the disclosure. The process 1200 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 1200 may be implemented by any suitable apparatus capable of supporting communication-related operations.

At block 1202, an apparatus (e.g., a UE) receives DCI.

At block 1204, the apparatus determines that the DCI indicates that a PDSCH allocation is semi-persistent.

At block 1206, the apparatus determines that the PDSCH follows the DCI by a sufficient time gap.

At block 1208, the apparatus determines the TCI state of a CORESET in which the DCI that scheduled the PDSCH transmission was received.

At block 1210, the apparatus decodes the PDSCH using the determined TCI state.

In some aspects, a process in accordance with the teachings herein may include any combination of the operations of FIG. 12.

Eighth Example Operations

Figure 13:
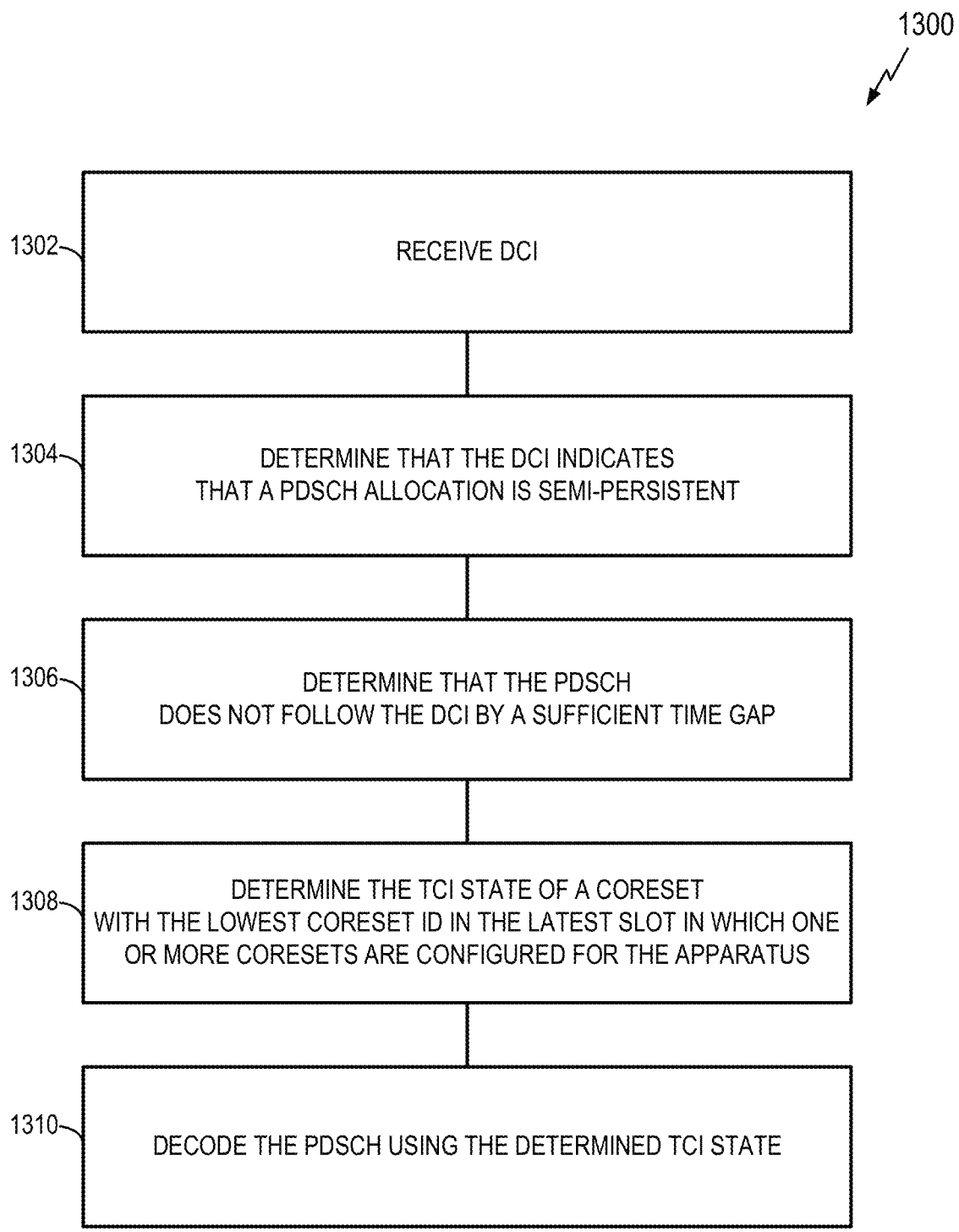
FIG. 13 is a flowchart illustrating an example of a process for decoding a PDSCH based on a TCI state of a CORESET with a lowest CORESET ID in accordance with some aspects of the disclosure.

FIG. 13 illustrates a process 1300 for communication in accordance with some aspects of the disclosure. The process 1300 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 1300 may be implemented by any suitable apparatus capable of supporting communication-related operations.

At block 1302, an apparatus (e.g., a UE) receives DCI.

At block 1304, the apparatus determines that the DCI indicates that a PDSCH allocation is semi-persistent.

At block 1306, the apparatus determines that the PDSCH does not follow the DCI by a sufficient time gap.

At block 1308, the apparatus determines the TCI state of a CORESET with the lowest CORESET ID in the latest slot in which one or more CORESETs are configured for the apparatus.

At block 1310, the apparatus decodes the PDSCH using the determined TCI state.

In some aspects, a process in accordance with the teachings herein may include any combination of the operations of FIG. 13.

First Example Apparatus

Figure 14:
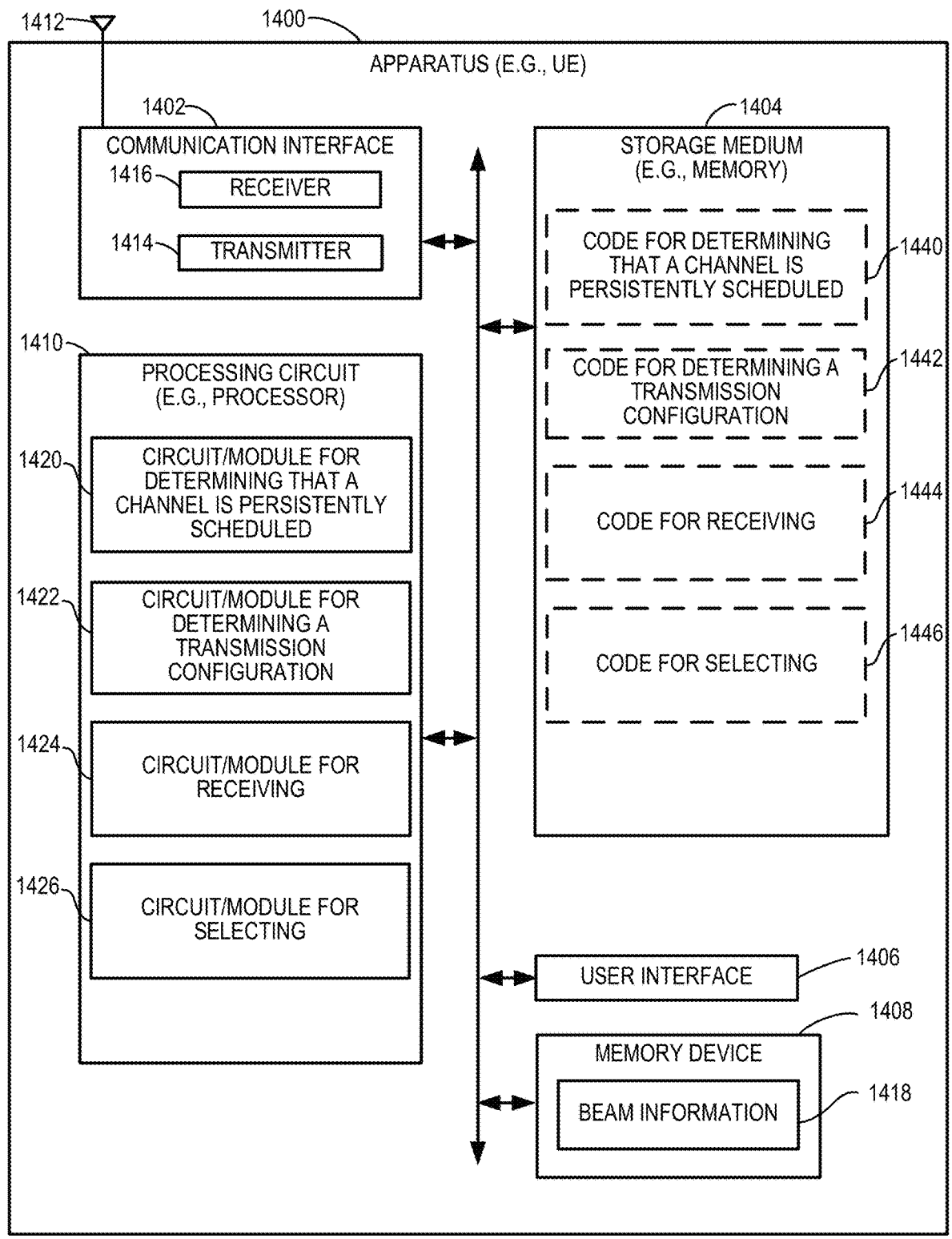
FIG. 14 is a block diagram illustrating an example hardware implementation for an apparatus (e.g., an electronic device) that can support communication in accordance with some aspects of the disclosure.

FIG. 14 illustrates a block diagram of an example hardware implementation of an apparatus 1400 configured to communicate according to one or more aspects of the disclosure. The apparatus 1400 could embody or be implemented within a UE, a gNB, a transmit receive point (TRP), a base station (BS), an eNode B (eNB), a CPE, or some other type of device that supports wireless communication. In various implementations, the apparatus 1400 could embody or be implemented within an access terminal, an access point, or some other type of device. In various implementations, the apparatus 1400 could embody or be implemented within a server, a personal computer, a mobile phone, a smart phone, a tablet, a portable computer, a sensor, an alarm, a vehicle, a machine, an entertainment device, a medical device, or any other electronic device having circuitry.

The apparatus 1400 includes a communication interface (e.g., at least one transceiver) 1402, a storage medium 1404, a user interface 1406, a memory device (e.g., a memory circuit) 1408, and a processing circuit 1410 (e.g., at least one processor). In various implementations, the user interface 1406 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 14. The signaling bus may include any number of interconnecting buses and bridges depending on the specific application of the processing circuit 1410 and the overall design constraints. The signaling bus links together various circuits such that each of the communication interface 1402, the storage medium 1404, the user interface 1406, and the memory device 1408 are coupled to and/or in electrical communication with the processing circuit 1410. The signaling bus may also link various other circuits (not shown) such as timing sources, peripherals, voltage regulators, and power management circuits, which are well known in the art, and therefore, will not be described any further.

The communication interface 1402 provides a means for communicating with other apparatuses over a transmission medium. In some implementations, the communication interface 1402 includes circuitry and/or programming adapted to facilitate the communication of information bi-directionally with respect to one or more communication devices in a network. In some implementations, the communication interface 1402 is adapted to facilitate wireless communication of the apparatus 1400. In these implementations, the communication interface 1402 may be coupled to one or more antennas 1412 as shown in FIG. 14 for wireless communication within a wireless communication system. In some implementations, the communication interface 1402 may be configured for wire-based communication. For example, the communication interface 1402 could be a bus interface, a send/receive interface, or some other type of signal interface including drivers, buffers, or other circuitry for outputting and/or obtaining signals (e.g., outputting signal from and/or receiving signals into an integrated circuit). The communication interface 1402 can be configured with one or more standalone receivers and/or transmitters, as well as one or more transceivers. In the illustrated example, the communication interface 1402 includes a transmitter 1414 and a receiver 1416. The communication interface 1402 serves as one example of a means for receiving and/or means transmitting.

The memory device 1408 may represent one or more memory devices. As indicated, the memory device 1408 may maintain beam information 1418 along with other information used by the apparatus 1400. In some implementations, the memory device 1408 and the storage medium 1404 are implemented as a common memory component. The memory device 1408 may also be used for storing data that is manipulated by the processing circuit 1410 or some other component of the apparatus 1400.

The storage medium 1404 may represent one or more computer-readable, machine-readable, and/or processor-readable devices for storing programming, such as processor executable code or instructions (e.g., software, firmware), electronic data, databases, or other digital information. The storage medium 1404 may also be used for storing data that is manipulated by the processing circuit 1410 when executing programming. The storage medium 1404 may be any available media that can be accessed by a general purpose or special purpose processor, including portable or fixed storage devices, optical storage devices, and various other mediums capable of storing, containing or carrying programming.

By way of example and not limitation, the storage medium 1404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1404 may be embodied in an article of manufacture (e.g., a computer program product). By way of example, a computer program product may include a computer-readable medium in packaging materials. In view of the above, in some implementations, the storage medium 1404 may be a non-transitory (e.g., tangible) storage medium. For example, the storage medium 1404 may be a non-transitory computer-readable medium storing computer-executable code, including code to perform operations as described herein.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where at least one storage medium is integral to the processing circuit 1410 and/or examples where at least one storage medium is separate from the processing circuit 1410 (e.g., resident in the apparatus 1400, external to the apparatus 1400, distributed across multiple entities, etc.).

Programming stored by the storage medium 1404, when executed by the processing circuit 1410, causes the processing circuit 1410 to perform one or more of the various functions and/or process operations described herein. For example, the storage medium 1404 may include operations configured for regulating operations at one or more hardware blocks of the processing circuit 1410, as well as to utilize the communication interface 1402 for wireless communication utilizing their respective communication protocols.

The processing circuit 1410 is generally adapted for processing, including the execution of such programming stored on the storage medium 1404. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1410 is arranged to obtain, process and/or send data, control data access and storage, issue commands, and control other desired operations. The processing circuit 1410 may include circuitry configured to implement desired programming provided by appropriate media in at least one example. For example, the processing circuit 1410 may be implemented as one or more processors, one or more controllers, and/or other structure configured to execute executable programming Examples of the processing circuit 1410 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1410 are for illustration and other suitable configurations within the scope of the disclosure are also contemplated.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-13 and 15-18. As used herein, the term "adapted" in relation to the processing circuit 1410 may refer to the processing circuit 1410 being one or more of configured, employed, implemented, and/or programmed to perform a particular process, function, operation and/or routine according to various features described herein.

The processing circuit 1410 may be a specialized processor, such as an application-specific integrated circuit (ASIC) that serves as a means for (e.g., structure for) carrying out any one of the operations described in conjunction with FIGS. 1-13 and 15-18. The processing circuit 1410 serves as one example of a means for transmitting and/or a means for receiving. In various implementations, the processing circuit 1410 may provide and/or incorporate, at least in part, the functionality described above for the second apparatus 404 (e.g., the beam controller 414) of FIG. 4.

According to at least one example of the apparatus 1400, the processing circuit 1410 may include one or more of a circuit/module for determining that a channel is persistently scheduled 1420, a circuit/module for determining a transmission configuration 1422, a circuit/module for receiving 1424, or a circuit/module for selecting 1426. In various implementations, the circuit/module for determining that a channel is persistently scheduled 1420, the circuit/module for determining a transmission configuration 1422, the circuit/module for receiving 1424, or the circuit/module for selecting 1426 may provide and/or incorporate, at least in part, the functionality described above for the second apparatus 404 (e.g., the beam controller 414) of FIG. 4.

As mentioned above, programming stored by the storage medium 1404, when executed by the processing circuit 1410, causes the processing circuit 1410 to perform one or more of the various functions and/or process operations described herein. For example, the programming may cause the processing circuit 1410 to perform the various functions, steps, and/or processes described herein with respect to FIGS. 1-13 and 15-18 in various implementations. As shown in FIG. 14, the storage medium 1404 may include one or more of code for determining that a channel is persistently scheduled 1440, code for determining a transmission configuration 1442, code for receiving 1444, or code for selecting 1446. In various implementations, the code for determining that a channel is persistently scheduled 1440, the code for determining a transmission configuration 1442, the code for receiving 1444, or the code for selecting 1446 may be executed or otherwise used to provide the functionality described herein for the circuit/module for determining that a channel is persistently scheduled 1420, the circuit/module for determining a transmission configuration 1422, the circuit/module for receiving 1424, or the circuit/module for selecting 1426.

The circuit/module for determining that a channel is persistently scheduled 1420 may include circuitry and/or programming (e.g., code for determining that a channel is persistently scheduled 1440 stored on the storage medium 1404) adapted to perform several functions relating to, for example, determining information relating to scheduling of a channel (e.g., by performing corresponding operations as discussed herein based on any corresponding criterion as discussed herein). In some aspects, the circuit/module for determining that a channel is persistently scheduled 1420 (e.g., a means for determining that a channel is persistently scheduled) may correspond to, for example, a processing circuit.

The circuit/module for determining a transmission configuration 1422 may include circuitry and/or programming (e.g., code for determining a transmission configuration 1442 stored on the storage medium 1404) adapted to perform several functions relating to, for example, determining configuration information associated with a transmission and/or reception (e.g., by performing corresponding operations as discussed herein based on any corresponding criterion as discussed herein). In some aspects, the circuit/module for determining a transmission configuration 1422 (e.g., a means for determining a transmission configuration) may correspond to, for example, a processing circuit.

The circuit/module for receiving 1424 may include circuitry and/or programming (e.g., code for receiving 1444 stored on the storage medium 1404) adapted to perform several functions relating to, for example, receiving information. In some scenarios, the circuit/module for receiving 1424 may obtain information (e.g., from the communication interface 1402, the memory device, or some other component of the apparatus 1400) and process (e.g., decode) the information. In some scenarios (e.g., if the circuit/module for receiving 1424 is or includes an RF receiver), the circuit/module for receiving 1424 may receive information directly from a device that transmitted the information. In either case, the circuit/module for receiving 1424 may output the obtained information to another component of the apparatus 1400 (e.g., the memory device 1408, or some other component).

The circuit/module for receiving 1424 (e.g., a means for receiving) may take various forms. In some aspects, the circuit/module for receiving 1424 may correspond to, for example, an interface (e.g., a bus interface, a/receive interface, or some other type of signal interface), a communication device, a transceiver, a receiver, or some other similar component as discussed herein. In some implementations, the communication interface 1402 includes the circuit/module for receiving 1424 and/or the code for receiving 1444. In some implementations, the circuit/module for receiving 1424 and/or the code for receiving 1444 is configured to control the communication interface 1402 (e.g., a transceiver or a receiver) to receive information.

The circuit/module for selecting 1426 may include circuitry and/or programming (e.g., code for selecting 1446 stored on the storage medium 1404) adapted to perform several functions relating to, for example, selecting a resource set and/or information related thereto (e.g., by performing corresponding operations as discussed herein based on any corresponding criterion as discussed herein). In some aspects, the circuit/module for selecting 1426 (e.g., a means for selecting) may correspond to, for example, a processing circuit.

First Example Process

Figure 15:
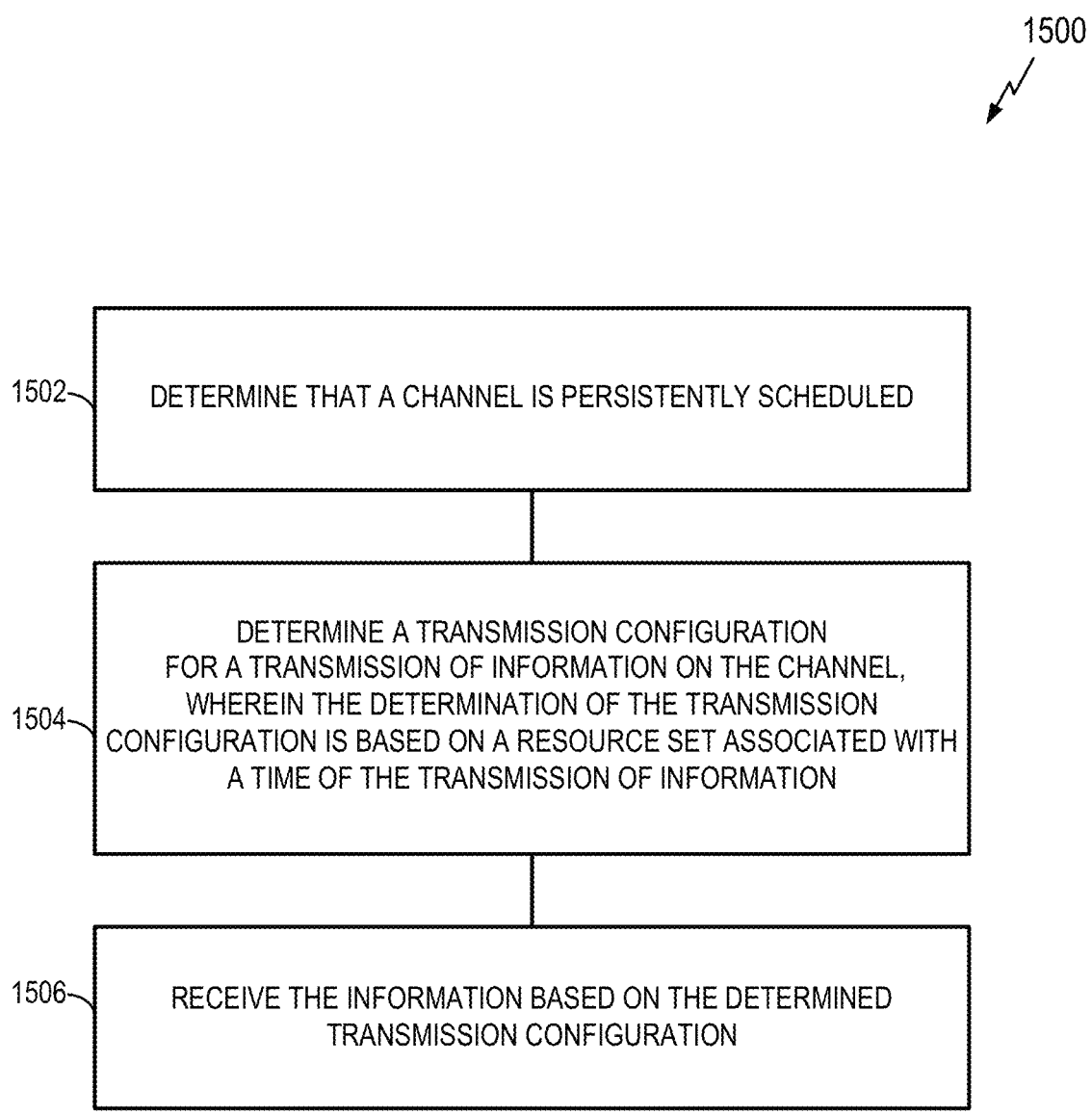
FIG. 15 is a flowchart illustrating an example of a process that involves determining a transmission configuration (e.g., including beam information) based on a resource set associated with a time of transmission in accordance with some aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 1500 may be implemented by any suitable apparatus capable of supporting communication-related operations.

At block 1502, an apparatus (e.g., a UE) determines that a channel is persistently scheduled. In some aspects, the channel may include (e.g., may be) a physical downlink shared channel. In some aspects, the determination that the channel is persistently scheduled may include receiving downlink control information that indicates semi-persistent scheduling.

In some implementations, the circuit/module for determining that a channel is persistently scheduled 1420 of FIG. 14 performs the operations of block 1502 and/or other similar operations as taught herein. In some implementations, the code for determining that a channel is persistently scheduled 1440 of FIG. 14 is executed to perform the operations of block 1502 and/or other similar operations as taught herein.

At block 1504, the apparatus determines a transmission configuration for a transmission of information on the channel. In some aspects, the determination of the transmission configuration may be based on a resource set associated with a time of the transmission of information. In some aspects, the transmission configuration may include beam information. In some aspects, the transmission configuration may include at least one of: a Doppler shift, a Doppler spread, an average delay, a delay spread, a spatial receive parameter, or any combination thereof. In some aspects, the resource set may include (e.g., may be) a control resource set (CORESET). In some aspects, the determination of the transmission configuration may include determining a transmission configuration indication that includes quasi co-location information.

In some aspects, the apparatus may select the resource set from a time slot allocated for the transmission of the information. In some aspects, the selected resource set may be the one closer to the time of the transmission of information than any other resource set in the time slot.

In some aspects, the resource set associated with a time of the transmission of information may be a resource set that precedes the time of the transmission of information and that is closer to the time of the transmission of information than any other resource set that precedes the time of the transmission of information.

In some implementations, the circuit/module for determining a transmission configuration 1422 of FIG. 14 performs the operations of block 1504 and/or other similar operations as taught herein. In some implementations, the code for determining a transmission configuration 1442 of FIG. 14 is executed to perform the operations of block 1504 and/or other similar operations as taught herein.

At block 1506, the apparatus receives the information based on the determined transmission configuration.

In some implementations, the circuit/module for receiving 1424 of FIG. 14 performs the operations of block 1506 and/or other similar operations as taught herein. In some implementations, the code for receiving 1444 of FIG. 14 is executed to perform the operations of block 1506 and/or other similar operations as taught herein.

In some aspects, the determination that the channel is persistently scheduled may include receiving first downlink control information that indicates semi-persistent scheduling. In this case, the process 1500 may include: receiving, before the first downlink control information has been received, second downlink control information that indicates semi-persistent scheduling, wherein the second downlink control information comprises a transmission configuration indication; and determining another transmission configuration for another transmission of information on the channel, wherein the determination of the other transmission configuration is based on the transmission configuration indication.

In some aspects, the process 1500 may be used for 5G NR communication. For example, the channel may be a physical downlink shared channel (PDSCH), the determination that the channel is persistently scheduled may include receiving downlink control information (DCI) that indicates semi-persistent scheduling (SPS); the determination of the transmission configuration may include determining a transmission configuration indication (TCI) that includes quasi co-location (QCL) information; and the resource set may be a control resource set (CORESET).

In some aspects, the resource set (e.g., a set of resource blocks and OFDMA symbols) is selected from the latest slot in which one or more resource sets are configured for the apparatus (e.g., the current slot for the transmission or an earlier slot). For example, the apparatus may select the resource set from a time slot allocated for the transmission of the information (e.g., where the selected resource set is closer to the time of the transmission of information than any other resource set in the time slot). As another example, the resource set: may precede the time of transmission of information, and may be closer to the time of transmission of information than any other resource set that precedes the time of transmission of information.

In some aspects, a process in accordance with the teachings herein may include any combination of the operations of FIG. 15.

Second Example Process

Figure 16:
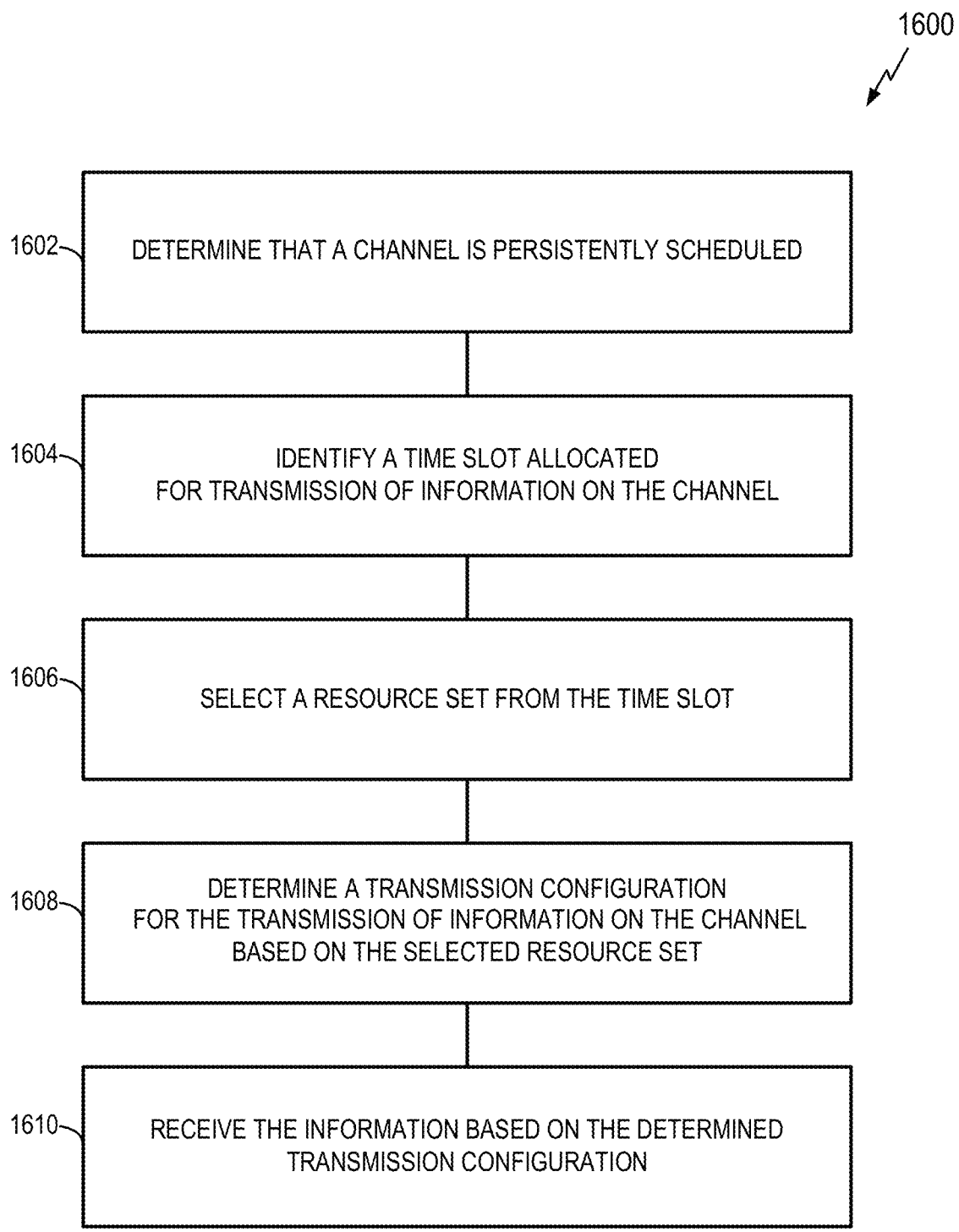
FIG. 16 is a flowchart illustrating an example of a process that involves determining a transmission configuration based on a resource set of a time slot in accordance with some aspects of the disclosure.

FIG. 16 illustrates a process 1600 for communication in accordance with some aspects of the disclosure. One or more aspects of the process 1600 may be used in conjunction with (e.g., in addition to or as part of) the process 1500 of FIG. 15. The process 1600 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 1600 may be implemented by any suitable apparatus capable of supporting communication-related operations.

At block 1602, an apparatus (e.g., a UE) determines that a channel is persistently scheduled.

At block 1604, the apparatus identifies a time slot allocated for transmission of information on the channel.

At block 1606, the apparatus selects a resource set from the time slot.

In some implementations, the circuit/module for selecting 1426 of FIG. 14 performs the operations of block 1606 and/or other similar operations as taught herein. In some implementations, the code for selecting 1446 of FIG. 14 is executed to perform the operations of block 1606 and/or other similar operations as taught herein.

At block 1608, the apparatus determines a transmission configuration for the transmission of information on the channel based on the selected resource set.

At block 1610, the apparatus receives the information based on the determined transmission configuration.

In some aspects, a process in accordance with the teachings herein may include any combination of the operations of FIG. 15.

Third Example Process

Figure 17:
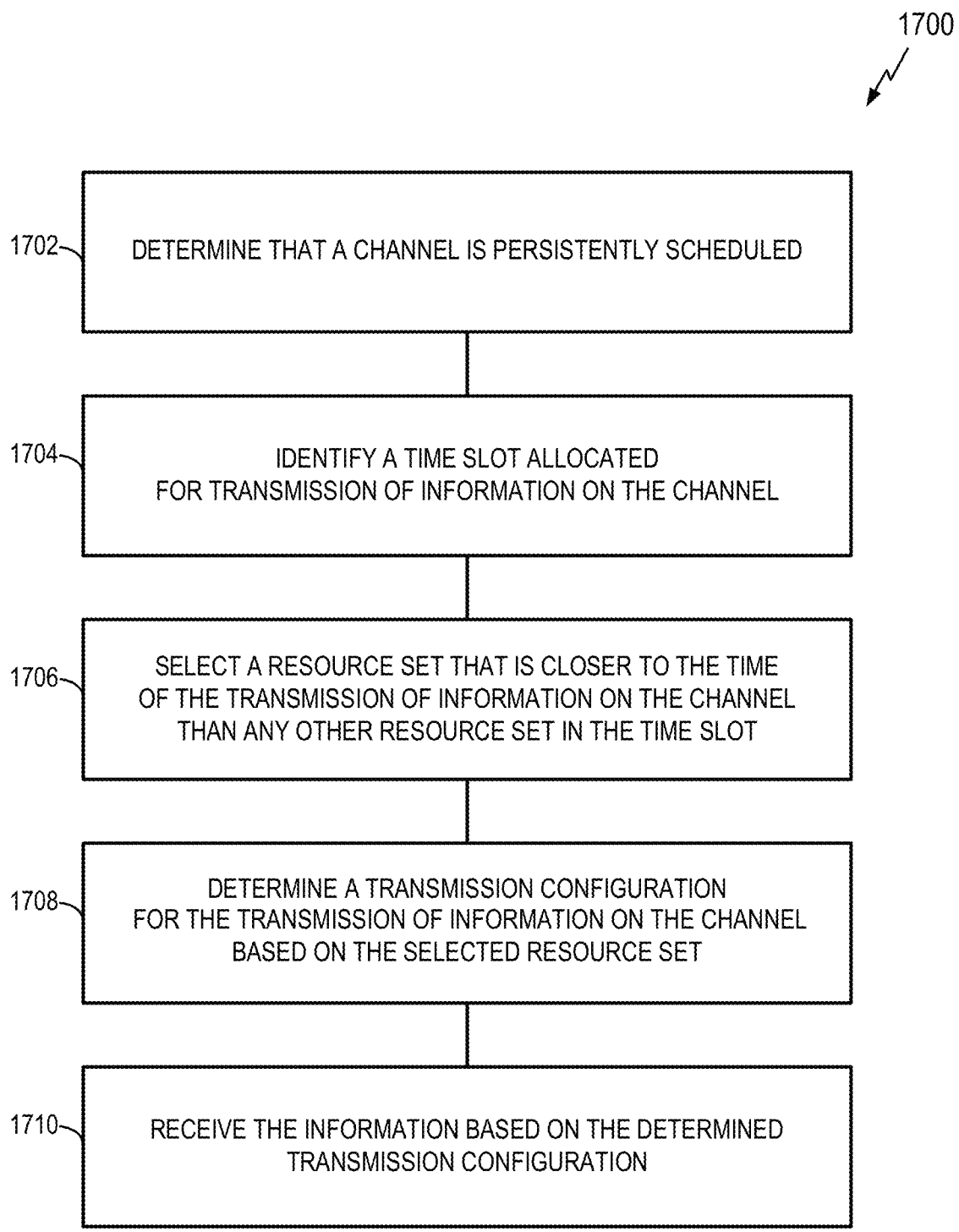
FIG. 17 is a flowchart illustrating an example of a process that involves determining a transmission configuration based on a resource set closer in time to a time of transmission in accordance with some aspects of the disclosure.

FIG. 17 illustrates a process 1700 for communication in accordance with some aspects of the disclosure. One or more aspects of the process 1700 may be used in conjunction with (e.g., in addition to or as part of) the process 1500 of FIG. 15. The process 1700 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 1700 may be implemented by any suitable apparatus capable of supporting communication-related operations.

At block 1702, an apparatus (e.g., a UE) determines that a channel is persistently scheduled.

At block 1704, the apparatus identifies a time slot allocated for transmission of information on the channel.

At block 1706, the apparatus selects a resource set that is closer to the time of the transmission of information on the channel than any other resource set in the time slot.

At block 1708, the apparatus determines a transmission configuration for the transmission of information on the channel based on the selected resource set.

At block 1710, the apparatus receives the information based on the determined transmission configuration.

In some aspects, a process in accordance with the teachings herein may include any combination of the operations of FIG. 17.

Fourth Example Process

Figure 18:
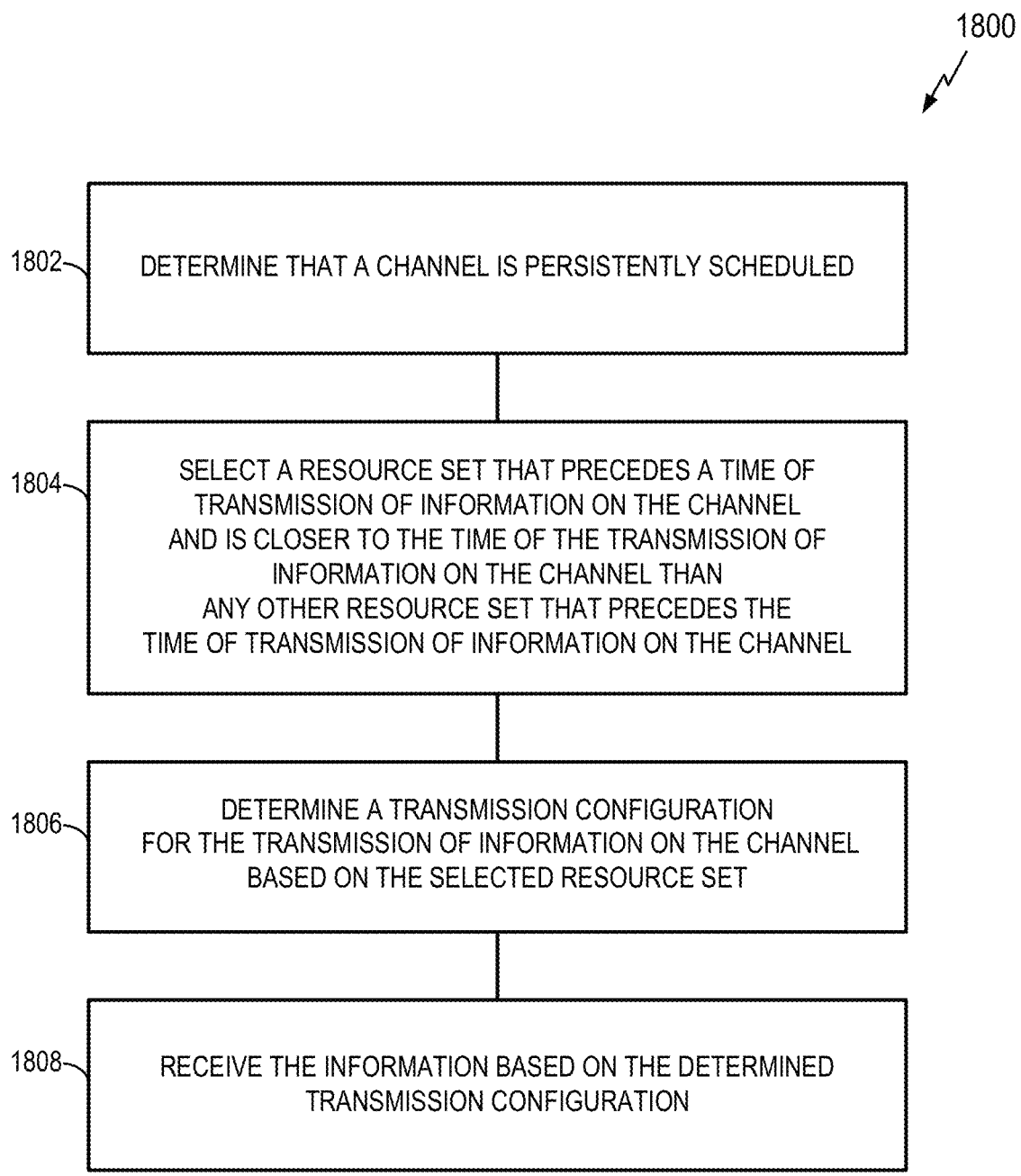
FIG. 18 is a flowchart illustrating an example of a process that involves determining a transmission configuration based on a resource set that precedes a time of transmission in accordance with some aspects of the disclosure.

FIG. 18 illustrates a process 1800 for communication in accordance with some aspects of the disclosure. One or more aspects of the process 1800 may be used in conjunction with (e.g., in addition to or as part of) the process 1500 of FIG. 15. The process 1800 may take place within a processing circuit (e.g., the processing circuit 1410 of FIG. 14), which may be located in a UE, a gNB, a TRP, a BS, an eNB, a CPE, or some other suitable apparatus. Of course, in various aspects within the scope of the disclosure, the process 1800 may be implemented by any suitable apparatus capable of supporting communication-related operations.

At block 1802, an apparatus (e.g., a UE) determines that a channel is persistently scheduled.

At block 1804, the apparatus selects a resource set that precedes a time transmission of information on the channel and is closer to the time of the transmission of information on the channel than any other resource set the precedes the time of transmission of information on the channel.

At block 1806, the apparatus determines a transmission configuration for the transmission of information on the channel based on the selected resource set.

At block 1808, the apparatus receives the information based on the determined transmission configuration.

In some aspects, a process in accordance with the teachings herein may include any combination of the operations of FIG. 18.

Second Example Apparatus

Figure 19:
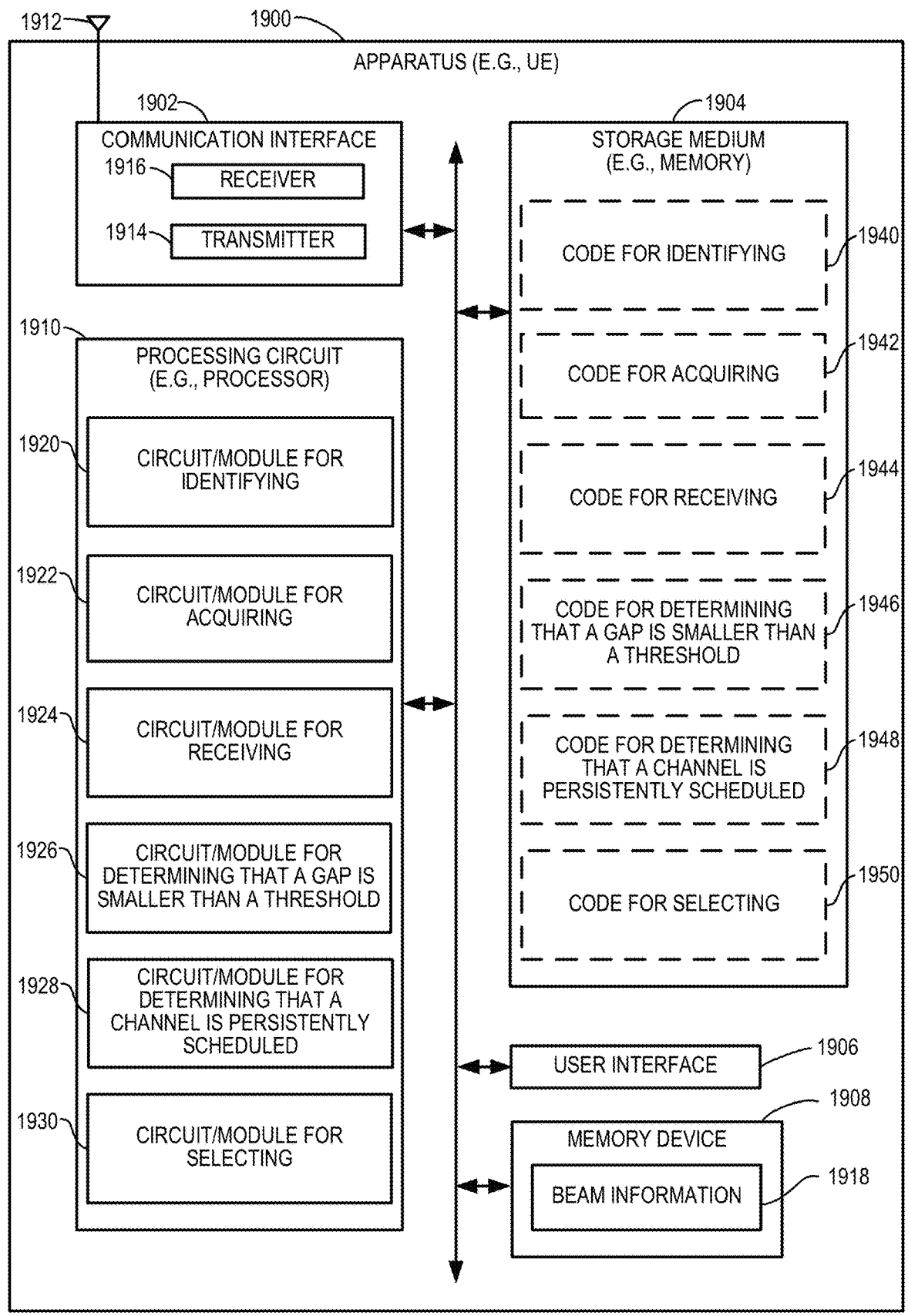
FIG. 19 is a block diagram illustrating an example hardware implementation for another apparatus (e.g., an electronic device) that can support communication in accordance with some aspects of the disclosure.

FIG. 19 illustrates a block diagram of an example hardware implementation of an apparatus 1900 configured to communicate according to one or more aspects of the disclosure. The apparatus 1900 could embody or be implemented within a UE, a gNB, a transmit receive point (TRP), a base station (BS), an eNode B (eNB), a CPE, or some other type of device that supports wireless communication. In various implementations, the apparatus 1900 could embody or be implemented within an access terminal, an access point, or some other type of device. In various implementations, the apparatus 1900 could embody or be implemented within a server, a personal computer, a mobile phone, a smart phone, a tablet, a portable computer, a sensor, an alarm, a vehicle, a machine, an entertainment device, a medical device, or any other electronic device having circuitry.

The apparatus 1900 includes a communication interface 1902 (e.g., at least one transceiver), a storage medium 1904, a user interface 1906, a memory device 1908 (e.g., storing beam information 1918), and a processing circuit 1910 (e.g., at least one processor). In various implementations, the user interface 1906 may include one or more of: a keypad, a display, a speaker, a microphone, a touchscreen display, of some other circuitry for receiving an input from or sending an output to a user. The communication interface 1902 may be coupled to one or more antennas 1912, and may include a transmitter 1914 and a receiver 1916. In general, the components of FIG. 19 may be similar to corresponding components of the apparatus 1400 of FIG. 14.

According to one or more aspects of the disclosure, the processing circuit 1910 may be adapted to perform any or all of the features, processes, functions, operations and/or routines for any or all of the apparatuses described herein. For example, the processing circuit 1910 may be configured to perform any of the steps, functions, and/or processes described with respect to FIGS. 1-13 and 20-26. As used herein, the term "adapted" in relation to the processing circuit 1910 may refer to the processing circuit 1910 being one or more of configured, used, implemented, and/or programmed to perform a particular process, function, operation and/or routine according to various features described herein.

The processing circuit 1910 may be a specialized processor, such as an application specific integrated circuit (ASIC) that serves as a means for (e.g., structure for) carrying out any one of the operations described in conjunction with FIGS. 1-13 and 20-26. The processing circuit 1910 may serve as one example of a means for transmitting and/or a means for receiving. In various implementations, the processing circuit 1910 may incorporate the functionality of the second apparatus 404 (e.g., the beam controller 414) of FIG. 4.

According to at least one example of the apparatus 1900, the processing circuit 1910 may include one or more of a circuit/module for identifying 1920, a circuit/module for acquiring 1922, a circuit/module for receiving 1924, a circuit/module for determining that a gap is smaller than a threshold 1926, a circuit/module for determining that a channel is persistently scheduled 1928, or a circuit/module for selecting 1930. In various implementations, the circuit/module for identifying 1920, the circuit/module for acquiring 1922, the circuit/module for receiving 1924, the circuit/module for determining that a gap is smaller than a threshold 1926, the circuit/module for determining that a channel is persistently scheduled 1928, or the circuit/module for selecting 1930 may incorporate the functionality of the second apparatus 404 (e.g., the beam controller 414) of FIG. 4.

As mentioned above, programming stored by the storage medium 1904, when executed by the processing circuit 1910, causes the processing circuit 1910 to perform one or more of the various functions and/or process operations described herein. For example, the programming may cause the processing circuit 1910 to perform the various functions, steps, and/or processes described herein with respect to FIGS. 1-13 and 20-26 in various implementations. As shown in FIG. 19, the storage medium 1904 may include one or more of code for identifying 1940, code for acquiring 1942, code for receiving 1944, code for determining that a gap is smaller than a threshold 1946, code for determining that a channel is persistently scheduled 1948, or code for selecting 1950. In various implementations, the code for identifying 1940, the code for acquiring 1942, the code for receiving 1944, the code for determining that a gap is smaller than a threshold 1946, the code for determining that a channel is persistently scheduled 1948, or the code for selecting 1950 may be executed or otherwise used to provide the functionality described herein for the circuit/module for identifying 1920, the circuit/module for acquiring 1922, the circuit/module for receiving 1924, the circuit/module for determining that a gap is smaller than a threshold 1926, the circuit/module for determining that a channel is persistently scheduled 1928, or the circuit/module for selecting 1930.

The circuit/module for identifying a resource set 1920 may include circuitry and/or programming (e.g., code for determining that a channel is persistently scheduled 1940 stored on the storage medium 1904) adapted to perform several functions relating to, for example, identifying a resource set and/or information related thereto (e.g., by performing corresponding operations as discussed herein based on any corresponding criterion as discussed herein). In some aspects, the circuit/module for determining that a channel is persistently scheduled 1920 (e.g., a means for determining that a channel is persistently scheduled) may correspond to, for example, a processing circuit.

The circuit/module for acquiring 1922 may include circuitry and/or programming (e.g., code for acquiring 1942 stored on the storage medium 1904) adapted to perform several functions relating to, for example, acquiring configuration information associated with a transmission and/or reception (e.g., by performing corresponding operations as discussed herein based on any corresponding criterion as discussed herein). In some aspects, the circuit/module for acquiring 1922 (e.g., a means for acquiring) may correspond to, for example, a processing circuit.

The circuit/module for receiving 1924 may include circuitry and/or programming (e.g., code for receiving 1944 stored on the storage medium 1904) adapted to perform several functions relating to, for example, receiving information. In some scenarios, the circuit/module for receiving 1924 may obtain information (e.g., from the communication interface 1902, the memory device, or some other component of the apparatus 1900) and process (e.g., decode) the information. In some scenarios (e.g., if the circuit/module for receiving 1924 is or includes an RF receiver), the circuit/module for receiving 1924 may receive information directly from a device that transmitted the information. In either case, the circuit/module for receiving 1924 may output the obtained information to another component of the apparatus 1900 (e.g., the memory device 1908, or some other component).

The circuit/module for receiving 1924 (e.g., a means for receiving) may take various forms. In some aspects, the circuit/module for receiving 1924 may correspond to, for example, an interface (e.g., a bus interface, a/receive interface, or some other type of signal interface), a communication device, a transceiver, a receiver, or some other similar component as discussed herein. In some implementations, the communication interface 1902 includes the circuit/module for receiving 1924 and/or the code for receiving 1944. In some implementations, the circuit/module for receiving 1924 and/or the code for receiving 1944 is configured to control the communication interface 1902 (e.g., a transceiver or a receiver) to receive information.

The circuit/module for determining that a gap is smaller than a threshold 1926 may include circuitry and/or programming (e.g., code for determining that a gap is smaller than a threshold 1946 stored on the storage medium 1904) adapted to perform several functions relating to, for example, determining an amount of a time gap (e.g., by performing corresponding operations as discussed herein based on any corresponding criterion as discussed herein). In some aspects, the circuit/module for determining that a gap is smaller than a threshold 1926 (e.g., a means for determining that a gap is smaller than a threshold) may correspond to, for example, a processing circuit.

The circuit/module for determining that a channel is persistently scheduled 1928 may include circuitry and/or programming (e.g., code for determining that a channel is persistently scheduled 1948 stored on the storage medium 1904) adapted to perform several functions relating to, for example, determining information relating to scheduling of a channel (e.g., by performing corresponding operations as discussed herein based on any corresponding criterion as discussed herein). In some aspects, the circuit/module for determining that a channel is persistently scheduled 1928

(e.g., a means for determining that a channel is persistently scheduled) may correspond to, for example, a processing circuit.

The circuit/module for selecting 1930 may include circuitry and/or programming (e.g., code for selecting 1950 stored on the storage medium 1904) adapted to perform several functions relating to, for example, selecting a resource set and/or information related thereto (e.g., by performing corresponding operations as discussed herein based on any corresponding criterion as discussed herein). In some aspects, the circuit/module for selecting 1930 (e.g., a means for selecting) may correspond to, for example, a processing circuit.

Fifth Example Process

Figure 20:
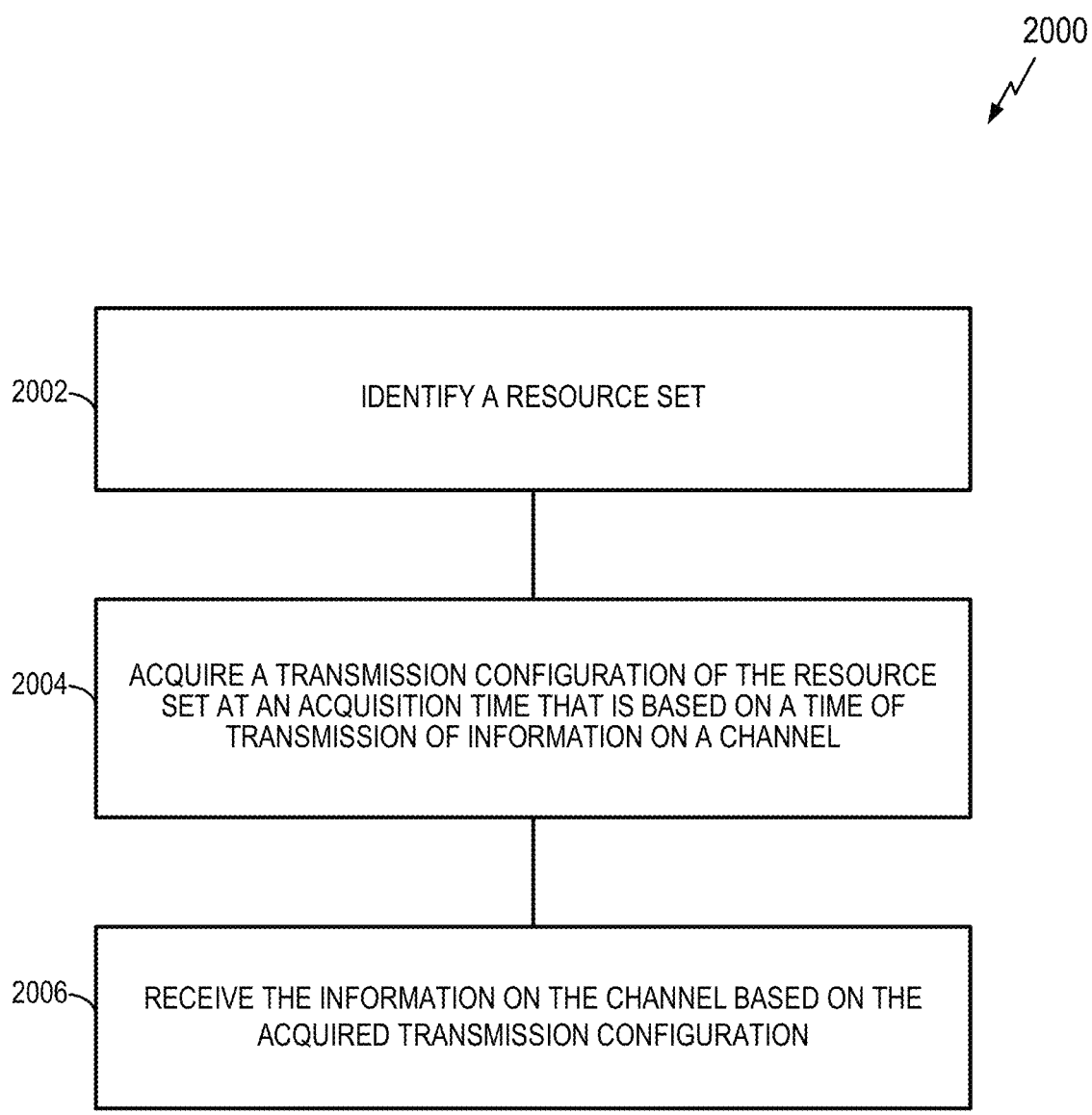
FIG. 20 is a flowchart illustrating an example of a process that involves acquiring a transmission configuration (e.g., including beam information) of a resource set at an acquisition time that is based on a time of transmission in accordance with some aspects of the disclosure.

FIG. 20 illustrates a process 2000 for communication in accordance with some aspects of the disclosure. The process 2000 may take place within a processing circuit (e.g., the processing circuit 1910 of FIG. 19), which may be located in a UE, a gNB, a TRP, a BS, an eNB, a CPE, or some other suitable apparatus. Of course, in various aspects within the scope of the disclosure, the process 2000 may be implemented by any suitable apparatus capable of supporting communication-related operations.

At block 2002, an apparatus (e.g., a UE) identifies a resource set. In some cases, the identification of the resource set may include identifying a resource set used to decode control information that scheduled the transmission of information.

In some cases, the process 2000 may include determining that a gap between a time of allocation of resources on the channel and the time of transmission of information on the channel is smaller than a threshold or equal to a threshold. In some aspects, as a result of the determination (e.g., if the gap is smaller than or equal to the threshold), the identification of the resource set may include identifying a resource set associated with the time of transmission of information.

In some cases, the process 2000 includes determining that the channel is persistently scheduled. In some aspects (e.g., if the channel is persistently scheduled), the identification of the resource set may include identifying a resource set associated with the time of transmission of information. In some aspects, the determination that the channel is persistently scheduled may include receiving downlink control information that indicates semi-persistent scheduling.

In some implementations, the circuit/module for identifying 1920 of FIG. 19 performs the operations of block 2002 and/or other similar operations as taught herein. In some implementations, the code for identifying 1940 of FIG. 19 is executed to perform the operations of block 2002 and/or other similar operations as taught herein.

At block 2004, the apparatus acquires a transmission configuration of the resource set at an acquisition time that is based on a time of transmission of information on a channel.

In some implementations, the circuit/module for acquiring 1922 of FIG. 19 performs the operations of block 2004 and/or other similar operations as taught herein. In some implementations, the code for acquiring 1942 of FIG. 19 is executed to perform the operations of block 2004 and/or other similar operations as taught herein.

At block 2006, the apparatus receives the information on the channel based on the acquired transmission configuration.

In some implementations, the circuit/module for receiving 1924 of FIG. 19 performs the operations of block 2006 and/or other similar operations as taught herein. In some implementations, the code for receiving 1944 of FIG. 19 is executed to perform the operations of block 2006 and/or other similar operations as taught herein.

In some aspects, the resource set may be a control resource set (CORESET), the transmission configuration may be a transmission configuration indication (TCI) that includes quasi co-location (QCL) information, the channel may be a physical downlink shared channel (PDSCH), and the control information may be downlink control information (DCI). For example, the process may be used for 5G NR communication.

In some aspects, the resource set (e.g., a set of resource blocks and OFDMA symbols) may be selected from the latest slot in which one or more resource sets are configured for the apparatus (e.g., the current slot for the transmission or an earlier slot).

In some aspects, the process 2000 may include selecting the resource set from a time slot allocated for the transmission of the information. In some aspects, the selected resource set is closer to the time of the transmission of information than any other resource set in the time slot.

In some aspects, the resource set may precede the time of transmission of information. In addition, the resource set may be closer to the time of transmission of information than any other resource set that precedes the time of transmission of information.

In some aspects, a process in accordance with the teachings herein may include any combination of the operations of FIG. 20.

Sixth Example Process

Figure 21:
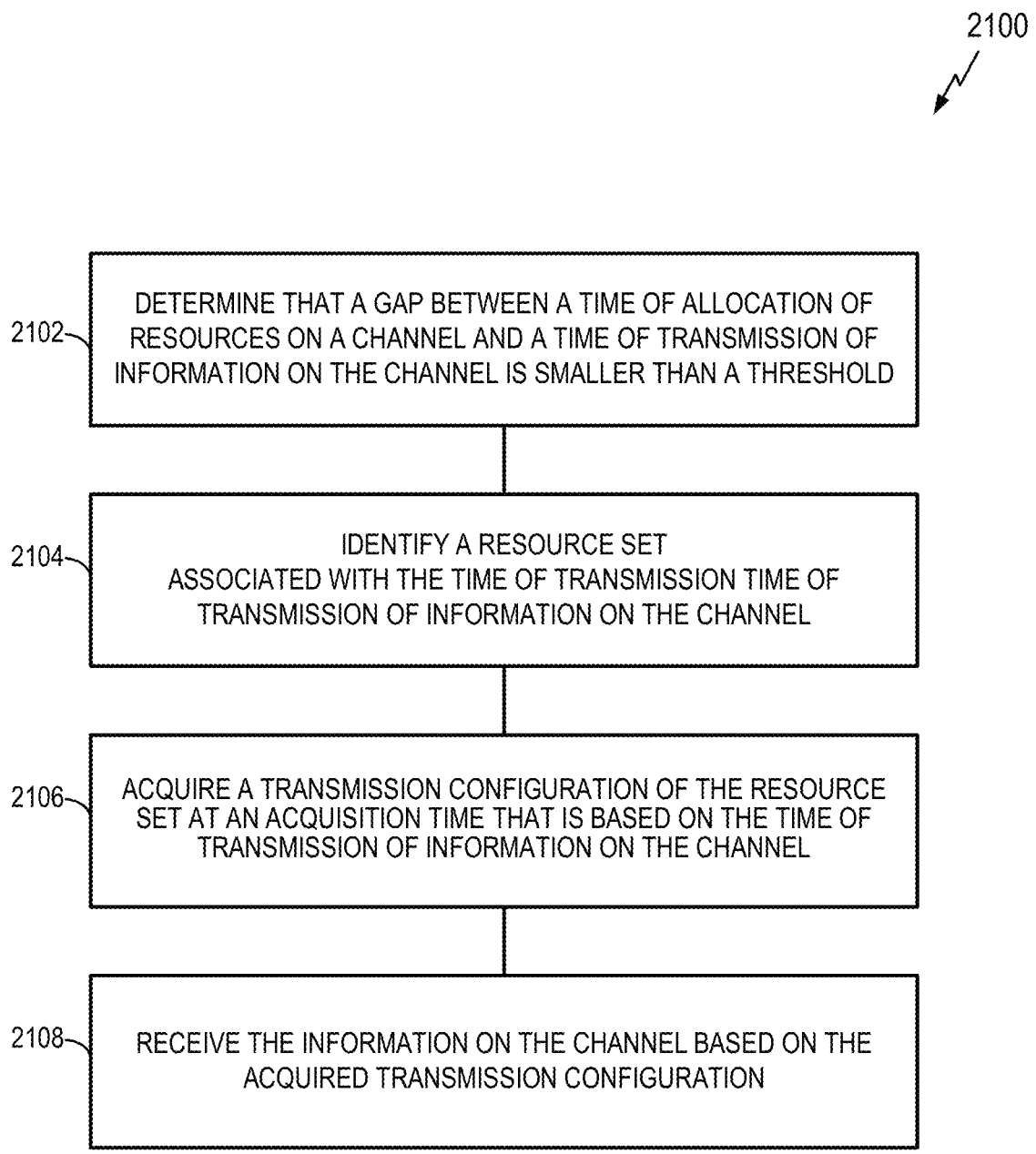
FIG. 21 is a flowchart illustrating an example of a process that involves acquiring a transmission configuration depending on a time gap in accordance with some aspects of the disclosure.

FIG. 21 illustrates a process 2100 for communication in accordance with some aspects of the disclosure. One or more aspects of the process 2100 may be used in conjunction with (e.g., in addition to or as part of) the process 2000 of FIG. 20. The process 2100 may take place within a processing circuit (e.g., the processing circuit 1910 of FIG. 19), which may be located in a UE, a gNB, a TRP, a BS, an eNB, a CPE, or some other suitable apparatus. Of course, in various aspects within the scope of the disclosure, the process 2100 may be implemented by any suitable apparatus capable of supporting communication-related operations.

At block 2102, an apparatus (e.g., a UE) determines that a gap between a time of allocation of resources on a channel and a time of transmission of information on the channel is smaller than a threshold.

In some implementations, the circuit/module for determining that a gap is smaller than a threshold 1926 of FIG. 19 performs the operations of block 2102 and/or other similar operations as taught herein. In some implementations, the code for determining that a gap is smaller than a threshold 1946 of FIG. 19 is executed to perform the operations of block 2102 and/or other similar operations as taught herein.

At block 2104, the apparatus identifies a resource set associated with the time of transmission of information on the channel.

At block 2104, the apparatus acquires a transmission configuration of the resource set at an acquisition time that is based on a time of transmission of information on a channel.

At block 2106, the apparatus receives the information on the channel based on the acquired transmission configuration.

In some aspects, a process in accordance with the teachings herein may include any combination of the operations of FIG. 21.

Seventh Example Process

Figure 22:
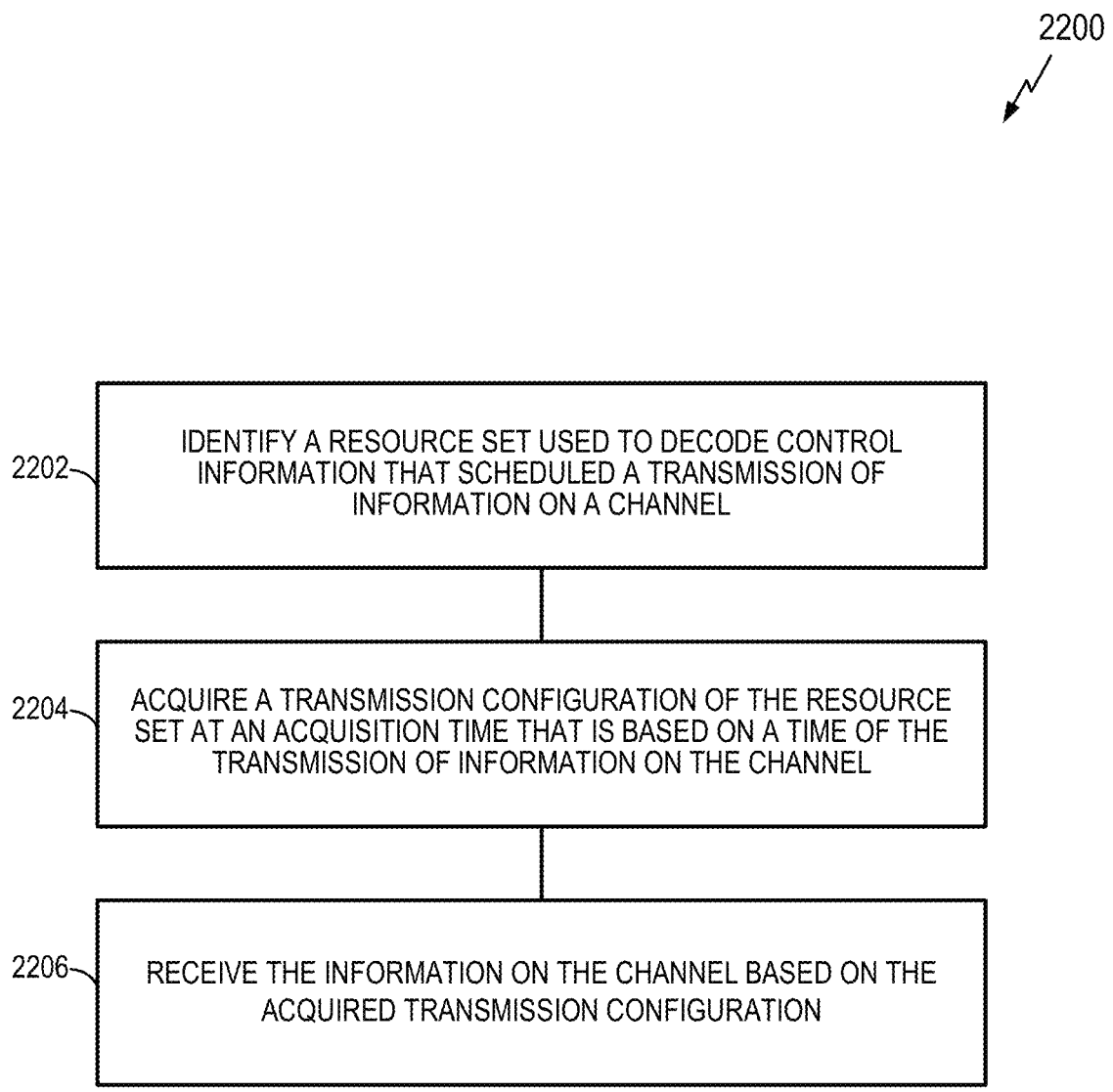
FIG. 22 is a flowchart illustrating an example of a process that involves acquiring a transmission configuration of a resource set used to decode control information in accordance with some aspects of the disclosure.

FIG. 22 illustrates a process 2200 for communication in accordance with some aspects of the disclosure. One or more aspects of the process 2200 may be used in conjunction with (e.g., in addition to or as part of) the process 2000 of FIG. 20. The process 2200 may take place within a processing circuit (e.g., the processing circuit 1910 of FIG. 19), which may be located in a UE, a gNB, a TRP, a BS, an eNB, a CPE, or some other suitable apparatus. Of course, in various aspects within the scope of the disclosure, the process 2200 may be implemented by any suitable apparatus capable of supporting communication-related operations.

At block 2202, an apparatus (e.g., a UE) identifies a resource set used to decode control information that scheduled a transmission of information on a channel.

At block 2204, the apparatus acquires a transmission configuration of the resource set at an acquisition time that is based on a time of transmission of information on the channel.

At block 2206, the apparatus receives the information on the channel based on the acquired transmission configuration.

In some aspects, a process in accordance with the teachings herein may include any combination of the operations of FIG. 22.

Eighth Example Process

Figure 23:
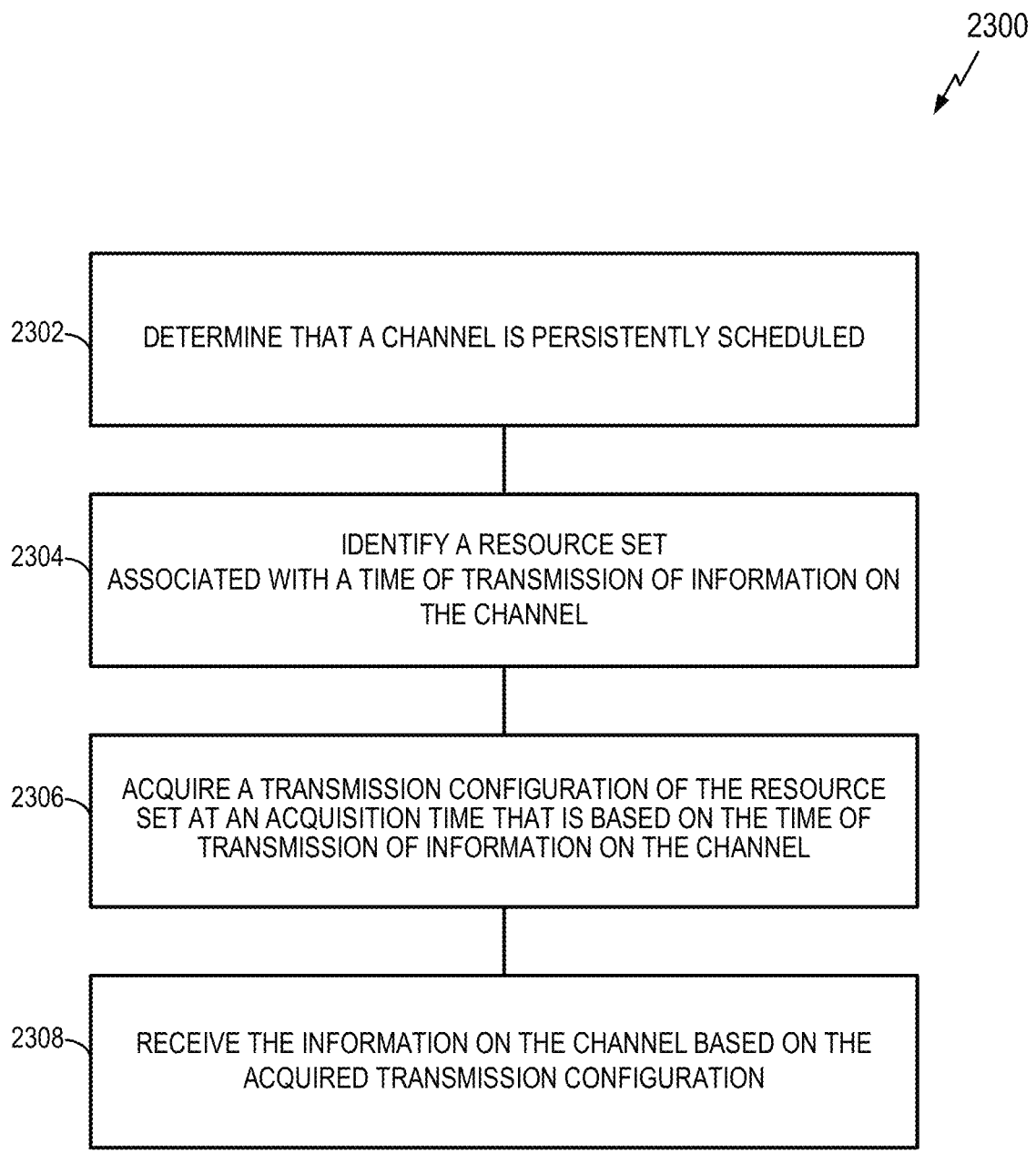
FIG. 23 is a flowchart illustrating an example of a process that involves acquiring a transmission configuration of a resource set associated with a time of transmission in accordance with some aspects of the disclosure.

FIG. 23 illustrates a process 2300 for communication in accordance with some aspects of the disclosure. One or more aspects of the process 2300 may be used in conjunction with (e.g., in addition to or as part of) the process 2000 of FIG. 20. The process 2300 may take place within a processing circuit (e.g., the processing circuit 1910 of FIG. 19), which may be located in a UE, a gNB, a TRP, a BS, an eNB, a CPE, or some other suitable apparatus. Of course, in various aspects within the scope of the disclosure, the process 2300 may be implemented by any suitable apparatus capable of supporting communication-related operations.

At block 2302, an apparatus (e.g., a UE) determines that a channel is persistently scheduled.

In some implementations, the circuit/module for determining that a channel is persistently scheduled 1928 of FIG. 19 performs the operations of block 2302 and/or other similar operations as taught herein. In some implementations, the code for determining that a channel is persistently scheduled 1948 of FIG. 19 is executed to perform the operations of block 2302 and/or other similar operations as taught herein.

At block 2304, the apparatus identifies a resource set associated with a time of transmission of information on the channel.

At block 2304, the apparatus acquires a transmission configuration of the resource set at an acquisition time that is based on a time of transmission of information on the channel.

At block 2306, the apparatus receives the information on the channel based on the acquired transmission configuration.

In some aspects, a process in accordance with the teachings herein may include any combination of the operations of FIG. 23.

Ninth Example Process

Figure 24:
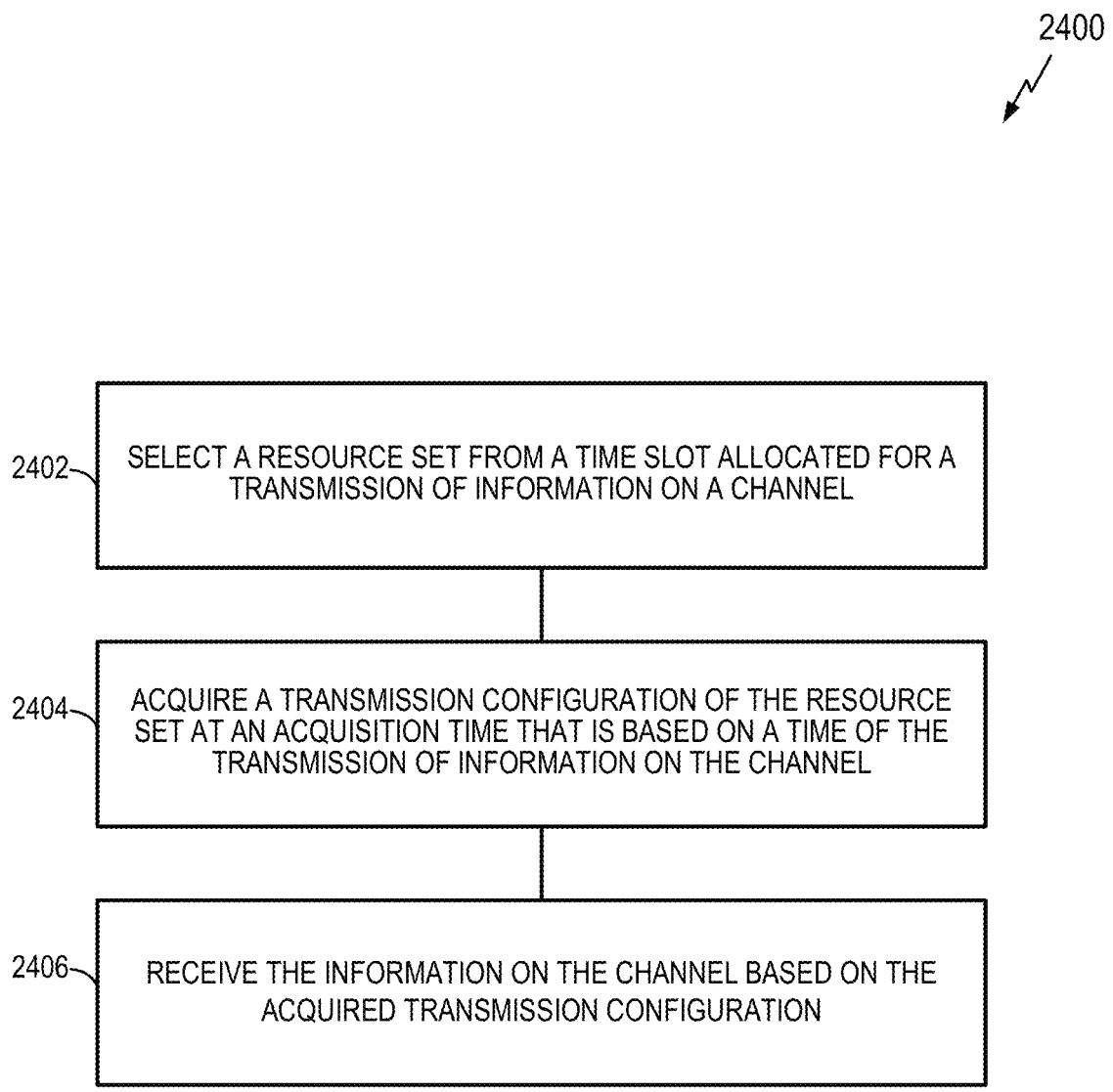
FIG. 24 is a flowchart illustrating an example of a process that involves acquiring a transmission configuration of a resource set of a time slot in accordance with some aspects of the disclosure.

FIG. 24 illustrates a process 2400 for communication in accordance with some aspects of the disclosure. One or more aspects of the process 2400 may be used in conjunction with (e.g., in addition to or as part of) the process 2000 of FIG. 20. The process 2400 may take place within a processing circuit (e.g., the processing circuit 1910 of FIG. 19), which may be located in a UE, a gNB, a TRP, a BS, an eNB, a CPE, or some other suitable apparatus. Of course, in various aspects within the scope of the disclosure, the process 2400 may be implemented by any suitable apparatus capable of supporting communication-related operations.

At block 2402, an apparatus (e.g., a UE) selects a resource set from a time slot allocated for a transmission of information on a channel.

In some implementations, the circuit/module for selecting 1930 of FIG. 19 performs the operations of block 2402 and/or other similar operations as taught herein. In some implementations, the code for selecting 1950 of FIG. 19 is executed to perform the operations of block 2402 and/or other similar operations as taught herein.

At block 2404, the apparatus acquires a transmission configuration of the resource set at an acquisition time that is based on a time of transmission of information on the channel.

At block 2406, the apparatus receives the information on the channel based on the acquired transmission configuration.

In some aspects, a process in accordance with the teachings herein may include any combination of the operations of FIG. 24.

Tenth Example Process

Figure 25:
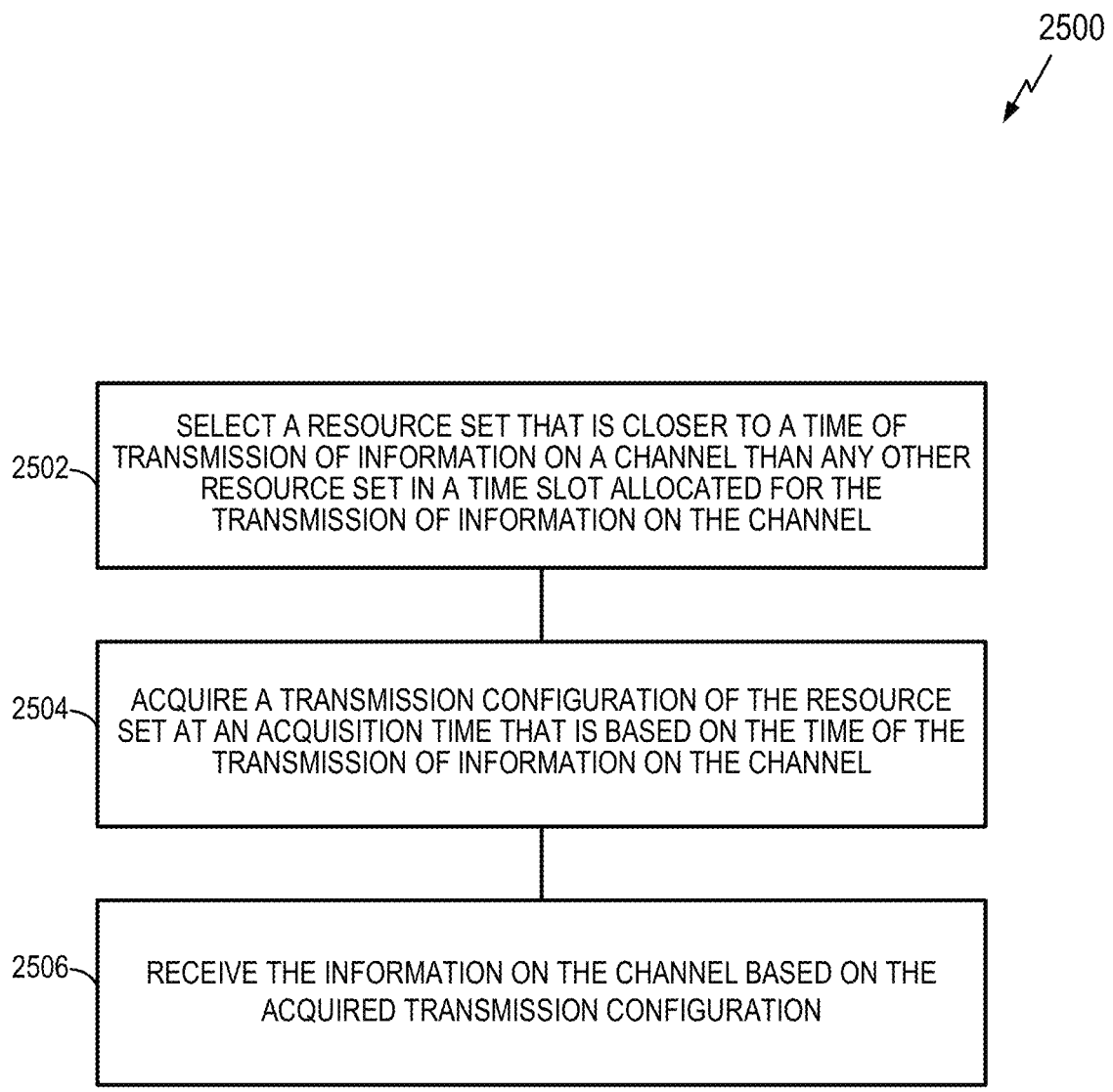
FIG. 25 is a flowchart illustrating an example of a process that involves acquiring a transmission configuration of a resource set that is closer in time to a time of transmission in accordance with some aspects of the disclosure.

FIG. 25 illustrates a process 2500 for communication in accordance with some aspects of the disclosure. One or more aspects of the process 2500 may be used in conjunction with (e.g., in addition to or as part of) the process 2000 of FIG. 20. The process 2500 may take place within a processing circuit (e.g., the processing circuit 1910 of FIG. 19), which may be located in a UE, a gNB, a TRP, a BS, an eNB, a CPE, or some other suitable apparatus. Of course, in various aspects within the scope of the disclosure, the process 2500 may be implemented by any suitable apparatus capable of supporting communication-related operations.

At block 2502, an apparatus (e.g., a UE) selects a resource set that is closer to a time of transmission of information on a channel than any other resource set in a time slot allocated for the transmission of information on the channel.

At block 2504, the apparatus acquires a transmission configuration of the resource set at an acquisition time that is based on the time of transmission of information on the channel.

At block 2506, the apparatus receives the information on the channel based on the acquired transmission configuration.

In some aspects, a process in accordance with the teachings herein may include any combination of the operations of FIG. 25.

Eleventh Example Process

Figure 26:
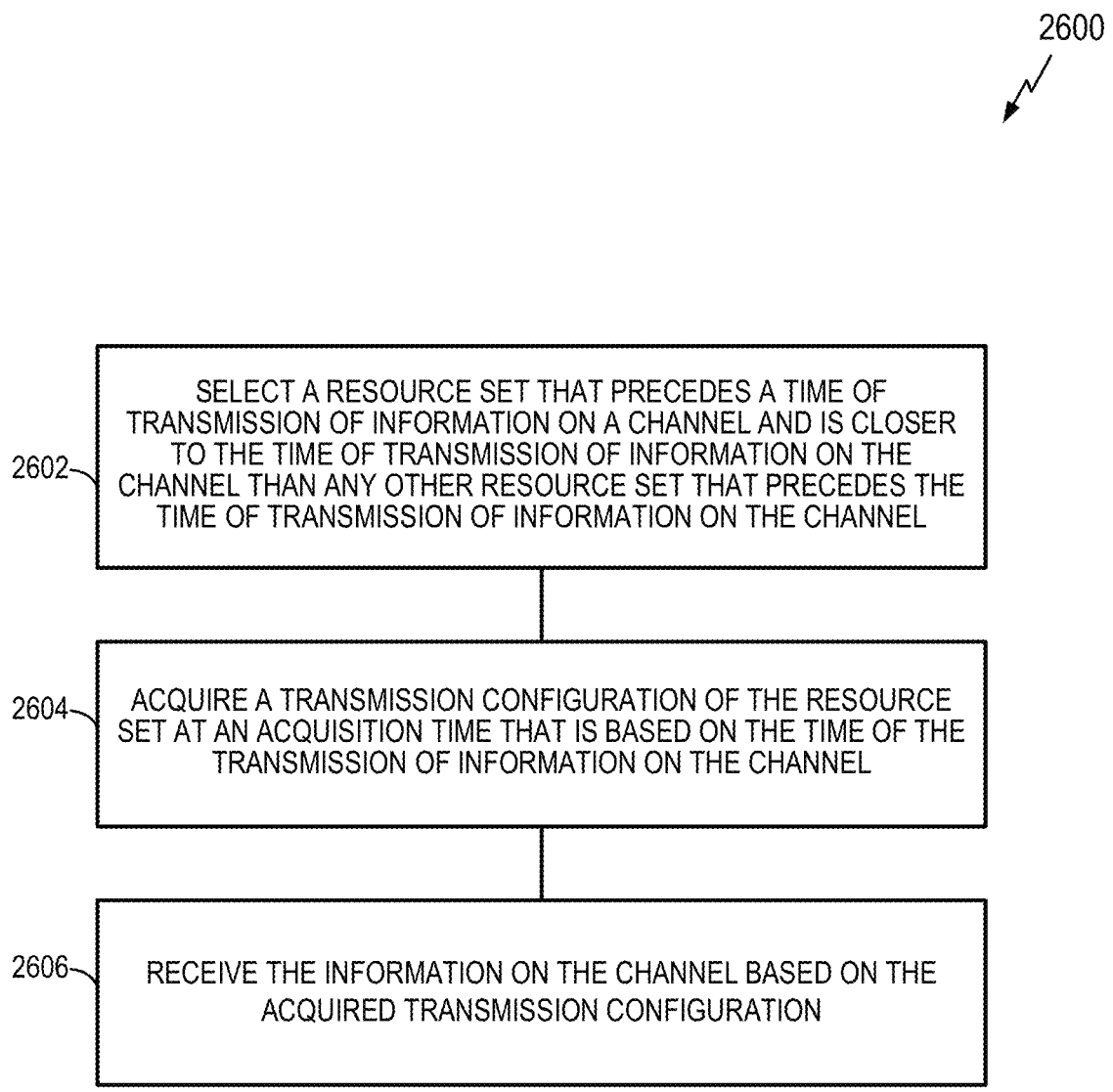
FIG. 26 is a flowchart illustrating an example of a process that involves acquiring a transmission configuration of a resource set that precedes a time of transmission in accordance with some aspects of the disclosure.

FIG. 26 illustrates a process 2600 for communication in accordance with some aspects of the disclosure. One or more aspects of the process 2600 may be used in conjunction with (e.g., in addition to or as part of) the process 2000 of FIG.

20. The process 2600 may take place within a processing circuit (e.g., the processing circuit 1910 of FIG. 19), which may be located in a UE, a gNB, a TRP, a BS, an eNB, a CPE, or some other suitable apparatus. Of course, in various aspects within the scope of the disclosure, the process 2600 may be implemented by any suitable apparatus capable of supporting communication-related operations.

At block 2602, an apparatus (e.g., a UE) selects a resource set that precedes a time of transmission of information on a channel and is closer to the time of transmission of information on the channel than any other resource set that precedes the time of transmission of information on the channel.

At block 2604, the apparatus acquires a transmission configuration of the resource set at an acquisition time that is based on the time of transmission of information on the channel.

At block 2606, the apparatus receives the information on the channel based on the acquired transmission configuration.

In some aspects, a process in accordance with the teachings herein may include any combination of the operations of FIG. 26.

Additional Aspects

In some aspects, the disclosure provides an apparatus for communication, the apparatus comprising: a processing circuit configured to determine that a channel is persistently scheduled, and determine a transmission configuration for a transmission of information on the channel, wherein the determination of the transmission configuration is based on a resource set associated with a time of the transmission of information; and a receiver configured to receive the information based on the determined transmission configuration.

The apparatus of the preceding paragraph may optionally include one or more of the following aspects. In some aspects, the processing circuit is further configured to select the resource set from a time slot allocated for the transmission of the information. In some aspects, the selected resource set is closer to the time of the transmission of information than any other resource set in the time slot. In some aspects, the resource set: precedes the time of the transmission of information; and is closer to the time of the transmission of information than any other resource set that precedes the time of the transmission of information. In some aspects, the channel comprises a physical downlink shared channel; the determination that the channel is persistently scheduled comprises receiving downlink control information that indicates semi-persistent scheduling; the determination of the transmission configuration comprises determining a transmission configuration indication that includes quasi co-location information; and the resource set comprises a control resource set. In some aspects, the transmission configuration comprises beam information. In some aspects, the transmission configuration comprises at least one of: a Doppler shift, a Doppler spread, an average delay, a delay spread, a spatial receive parameter, or any combination thereof. In some aspects, the determination that the channel is persistently scheduled comprises receiving first downlink control information that indicates semi-persistent scheduling, and the receiver is further configured to receive, before the first downlink control information has been released, second downlink control information that indicates semi-persistent scheduling, wherein the second downlink control information comprises a transmission configuration indication; and the processing circuit is further configured to determine another transmission configuration for another transmission of information on the channel, wherein the determination of the other transmission configuration is based on the transmission configuration indication.

In some aspects, the disclosure provides a method of communication for an apparatus, the method comprising: determining that a channel is persistently scheduled; determining a transmission configuration for a transmission of information on the channel, wherein the determination of the transmission configuration is based on a resource set associated with a time of the transmission of information; and receiving the information based on the determined transmission configuration.

The method of the preceding paragraph may optionally include one or more of the following aspects. In some aspects, the method further comprises selecting the resource set from a time slot allocated for the transmission of the information. In some aspects, the selected resource set is closer to the time of the transmission of information than any other resource set in the time slot. In some aspects, the resource set: precedes the time of the transmission of information; and is closer to the time of the transmission of information than any other resource set that precedes the time of the transmission of information. In some aspects, the channel comprises a physical downlink shared channel; the determination that the channel is persistently scheduled comprises receiving downlink control information that indicates semi-persistent scheduling; the determination of the transmission configuration comprises determining a transmission configuration indication that includes quasi co-location information; and the resource set comprises a control resource set. In some aspects, the transmission configuration comprises beam information. In some aspects, the transmission configuration comprises at least one of: a Doppler shift, a Doppler spread, an average delay, a delay spread, a spatial receive parameter, or any combination thereof. In some aspects, the determination that the channel is persistently scheduled comprises receiving first downlink control information that indicates semi-persistent scheduling, and the method further comprises: receiving, before the first downlink control information has been released, second downlink control information that indicates semi-persistent scheduling, wherein the second downlink control information comprises a transmission configuration indication; and determining another transmission configuration for another transmission of information on the channel, wherein the determination of the other transmission configuration is based on the transmission configuration indication.

In some aspects, the disclosure provides an apparatus for communication, the apparatus comprising: means for determining that a channel is persistently scheduled; means for determining a transmission configuration for a transmission of information on the channel, wherein the determination of the transmission configuration is based on a resource set associated with a time of the transmission of information; and means for receiving the information based on the determined transmission configuration.

The apparatus of the preceding paragraph may optionally include one or more of the following aspects. In some aspects, the apparatus further comprises means for selecting the resource set from a time slot allocated for the transmission of the information. In some aspects, the selected resource set is closer to the time of the transmission of information than any other resource set in the time slot. In some aspects, the resource set: precedes the time of the transmission of information; and is closer to the time of the transmission of information than any other resource set that precedes the time of the transmission of information. In some aspects, the channel comprises a physical downlink shared channel; the determination that the channel is persistently scheduled comprises receiving downlink control information that indicates semi-persistent scheduling; the determination of the transmission configuration comprises determining a transmission configuration indication that includes quasi co-location information; and the resource set comprises a control resource set. In some aspects, the transmission configuration comprises beam information. In some aspects, the transmission configuration comprises at least one of: a Doppler shift, a Doppler spread, an average delay, a delay spread, a spatial receive parameter, or any combination thereof. In some aspects, the determination that the channel is persistently scheduled comprises receiving first downlink control information that indicates semi-persistent scheduling, and the means for receiving is configured to receive, before the first downlink control information has been released, second downlink control information that indicates semi-persistent scheduling, wherein the second downlink control information comprises a transmission configuration indication; and the means for determining a transmission configuration is configured to determine another transmission configuration for another transmission of information on the channel, wherein the determination of the other transmission configuration is based on the transmission configuration indication.

In some aspects, the disclosure provides a non-transitory computer-readable medium storing computer-executable code, including code to: determine that a channel is persistently scheduled; determine a transmission configuration for a transmission of information on the channel, wherein the determination of the transmission configuration is based on a resource set associated with a time of the transmission of information; and receive the information based on the determined transmission configuration.

The computer-readable medium of the preceding paragraph may optionally include one or more of the following aspects. In some aspects, the computer-readable medium further comprises code to select the resource set from a time slot allocated for the transmission of the information. In some aspects, the selected resource set is closer to the time of the transmission of information than any other resource set in the time slot. In some aspects, the resource set: precedes the time of the transmission of information; and is closer to the time of the transmission of information than any other resource set that precedes the time of the transmission of information. In some aspects, the channel comprises a physical downlink shared channel; the determination that the channel is persistently scheduled comprises receiving downlink control information that indicates semi-persistent scheduling; the determination of the transmission configuration comprises determining a transmission configuration indication that includes quasi co-location information; and the resource set comprises a control resource set. In some aspects, the transmission configuration comprises beam information. In some aspects, the transmission configuration comprises at least one of: a Doppler shift, a Doppler spread, an average delay, a delay spread, a spatial receive parameter, or any combination thereof. In some aspects, the determination that the channel is persistently scheduled comprises receiving first downlink control information that indicates semi-persistent scheduling, and the computer-readable medium further comprises code to: receive, before the first downlink control information has been released, second downlink control information that indicates semi-persistent scheduling, wherein the second downlink control information comprises a transmission configuration indication; and determine another transmission configuration for another transmission of information on the channel, wherein the determination of the other transmission configuration is based on the transmission configuration indication.

In some aspects, the disclosure provides an apparatus for communication, the apparatus comprising: a processing circuit configured to identify a resource set, and acquire a transmission configuration of the resource set at an acquisition time that is based on a time of transmission of information on a channel; and a receiver s configured to receive the information on the channel based on the acquired transmission configuration.

The apparatus of the preceding paragraph may optionally include one or more of the following aspects. In some aspects, the processing circuit is further configured to determine that a gap between a time of allocation of resources on the channel and the time of transmission of information on the channel is smaller than a threshold; and the identification of the resource set comprises identifying a resource set associated with the time of transmission of information. In some aspects, the identification of the resource set comprises identifying a resource set used to decode control information that scheduled the transmission of information. In some aspects, the resource set comprises a control resource set; the transmission configuration comprises a transmission configuration indication that includes quasi co-location information; the channel comprises a physical downlink shared channel; and the control information comprises downlink control information. In some aspects, the processing circuit is further configured to determine that the channel is persistently scheduled, and the identification of the resource set comprises identifying a resource set associated with the time of transmission of information. In some aspects, the resource set comprises a control resource set; the transmission configuration comprises a transmission configuration indication that includes quasi co-location information; the channel comprises a physical downlink shared channel; and the determination that the channel is persistently scheduled comprises receiving downlink control information that indicates semi-persistent scheduling. In some aspects, the processing circuit is further configured to select the resource set from a time slot allocated for the transmission of the information. In some aspects, the selected resource set is closer to the time of transmission of information than any other resource set in the time slot. In some aspects, the resource set: precedes the time of transmission of information; and is closer to the time of transmission of information than any other resource set that precedes the time of transmission of information.

In some aspects, the disclosure provides a method of communication for an apparatus, comprising: identifying a resource set; acquiring a transmission configuration of the resource set at an acquisition time that is based on a time of transmission of information on a channel; and receiving the information on the channel based on the acquired transmission configuration.

The apparatus of the preceding paragraph may optionally include one or more of the following aspects. In some aspects, the method further comprises: determining that a gap between a time of allocation of resources on the channel and the time of transmission of information on the channel is smaller than a threshold, wherein the identification of the resource set comprises identifying a resource set associated with the time of transmission of information. In some aspects, the identification of the resource set comprises identifying a resource set used to decode control information that scheduled the transmission of information. In some aspects, the resource set comprises a control resource set; the transmission configuration comprises a transmission configuration indication that includes quasi co-location information; the channel comprises a physical downlink shared channel; and the control information comprises downlink control information. In some aspects, the method further comprises determining that the channel is persistently scheduled, wherein the identification of the resource set comprises identifying a resource set associated with the time of transmission of information. In some aspects, the resource set comprises a control resource set; the transmission configuration comprises a transmission configuration indication that includes quasi co-location information; the channel comprises a physical downlink shared channel; and the determination that the channel is persistently scheduled comprises receiving downlink control information that indicates semi-persistent scheduling. In some aspects, the method further comprises selecting the resource set from a time slot allocated for the transmission of the information. In some aspects, the selected resource set is closer to the time of transmission of information than any other resource set in the time slot. In some aspects, the resource set: precedes the time of transmission of information; and is closer to the time of transmission of information than any other resource set that precedes the time of transmission of information.

In some aspects, the disclosure provides an apparatus for communication, comprising: means for identifying a resource set; means for acquiring a transmission configuration of the resource set at an acquisition time that is based on a time of transmission of information on a channel; and means for receiving the information on the channel based on the acquired transmission configuration.

The apparatus of the preceding paragraph may optionally include one or more of the following aspects. In some aspects, the apparatus further comprises: means for determining that a gap between a time of allocation of resources on the channel and the time of transmission of information on the channel is smaller than a threshold, wherein the identification of the resource set comprises identifying a resource set associated with the time of transmission of information. In some aspects, the identification of the resource set comprises identifying a resource set used to decode control information that scheduled the transmission of information. In some aspects, the resource set comprises a control resource set; the transmission configuration comprises a transmission configuration indication that includes quasi co-location information; the channel comprises a physical downlink shared channel; and the control information comprises downlink control information. In some aspects, the method further comprises means for determining that the channel is persistently scheduled, wherein the identification of the resource set comprises identifying a resource set associated with the time of transmission of information. In some aspects, the resource set comprises a control resource set; the transmission configuration comprises a transmission configuration indication that includes quasi co-location information; the channel comprises a physical downlink shared channel; and the determination that the channel is persistently scheduled comprises receiving downlink control information that indicates semi-persistent scheduling. In some aspects, the method further comprises means for selecting the resource set from a time slot allocated for the transmission of the information. In some aspects, the selected resource set is closer to the time of transmission of information than any other resource set in the time slot. In some aspects, the resource set: precedes the time of transmission of information; and is closer to the time of transmission of information than any other resource set that precedes the time of transmission of information.

In some aspects, the disclosure provides a non-transitory computer-readable medium storing computer-executable code, including code to: identify a resource set; acquire a transmission configuration of the resource set at an acquisition time that is based on a time of transmission of information on a channel; and receive the information on the channel based on the acquired transmission configuration.

The computer-readable medium of the preceding paragraph may optionally include one or more of the following aspects. In some aspects, the computer-readable medium further includes code to: determine that a gap between a time of allocation of resources on the channel and the time of transmission of information on the channel is smaller than a threshold, wherein the identification of the resource set comprises identifying a resource set associated with the time of transmission of information. In some aspects, the identification of the resource set comprises identifying a resource set used to decode control information that scheduled the transmission of information. In some aspects, the resource set comprises a control resource set; the transmission configuration comprises a transmission configuration indication that includes quasi co-location information; the channel comprises a physical downlink shared channel; and the control information comprises downlink control information. In some aspects, the computer-readable medium further includes code to determine that the channel is persistently scheduled, wherein the identification of the resource set comprises identifying a resource set associated with the time of transmission of information. In some aspects, the resource set comprises a control resource set; the transmission configuration comprises a transmission configuration indication that includes quasi co-location information; the channel comprises a physical downlink shared channel; and the determination that the channel is persistently scheduled comprises receiving downlink control information that indicates semi-persistent scheduling. In some aspects, the computer-readable medium further includes code to select the resource set from a time slot allocated for the transmission of the information. In some aspects, the selected resource set is closer to the time of transmission of information than any other resource set in the time slot. In some aspects, the resource set: precedes the time of transmission of information; and is closer to the time of transmission of information than any other resource set that precedes the time of transmission of information.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. An apparatus for communication, comprising:
   a processing circuit configured to:
      determine that a channel is semi-persistently scheduled, and
      determine a transmission configuration for a transmission of downlink information by a base station on the channel, wherein the determination of the transmission configuration is based on a first resource set associated with a time of the transmission of the downlink information, and wherein a first time associated with the first resource set precedes the time of the transmission of the downlink information and is closer to the time of the transmission of the downlink information than a second time associated with any other resource set used by the apparatus to receive another transmission from the base station prior to the time of the transmission of the downlink information; and
   a receiver configured to receive the downlink information based on the determined transmission configuration.

2. The apparatus of claim 1, wherein the processing circuit is further configured to:
   select the first resource set from a time slot allocated for the transmission of the downlink information.

3. The apparatus of claim 2, wherein the first resource set is closer to the time of the transmission of the downlink information than any other resource set in the time slot.

4. The apparatus of claim 1, wherein the determination that the channel is semi-persistently scheduled comprises receiving downlink control information that indicates semi-persistent scheduling.

5. The apparatus of claim 4, wherein the determination of the transmission configuration comprises determining a transmission configuration indication that includes quasi co-location information.

6. The apparatus of claim 1, wherein the transmission configuration comprises a Doppler shift.

7. The apparatus of claim 1, wherein the transmission configuration comprises a Doppler spread.

8. The apparatus of claim 1, wherein the transmission configuration comprises an average delay.

9. The apparatus of claim 1, wherein the transmission configuration comprises a delay spread.

10. The apparatus of claim 1, wherein the transmission configuration comprises a spatial receive parameter.

11. The apparatus of claim 1, wherein:
   the determination that the channel is semi-persistently scheduled comprises receiving first downlink control information that indicates semi-persistent scheduling;
   the receiver is further configured to receive, before the first downlink control information has been received, second downlink control information that indicates semi-persistent scheduling, wherein the second downlink control information comprises a transmission configuration indication; and
   the processing circuit is further configured to determine another transmission configuration for another transmission of downlink information on the channel, wherein the determination of the other transmission configuration is based on the transmission configuration indication.

12. The apparatus of claim 1, wherein the processing circuit is further configured to:
   determine a first transmission configuration indication (TCI) state associated with the first resource set; and
   determine the transmission configuration for the transmission of the downlink information based on the first TCI state.

13. A method of communication for an apparatus, comprising:
   determining that a channel is semi-persistently scheduled;
   determining a transmission configuration for a transmission of downlink information by a base station on the channel, wherein the determination of the transmission configuration is based on a first resource set associated with a time of the transmission of the downlink information, and wherein a first time associated with the first resource set precedes the time of the transmission of the downlink information and is closer to the time of the transmission of the downlink information than a second time associated with any other resource set used by the apparatus to receive another transmission from the base station prior to the time of the transmission of the downlink information; and
   receiving the downlink information based on the determined transmission configuration.

14. The method of claim 13, wherein:
   the channel comprises a physical downlink shared channel;
   the determining that the channel is semi-persistently scheduled comprises receiving downlink control information that indicates semi-persistent scheduling;
   the determining the transmission configuration comprises determining a transmission configuration indication that includes quasi co-location information; and
   the first resource set comprises a control resource set.

15. The method of claim 14, wherein the transmission configuration comprises at least one of: a Doppler shift, a Doppler spread, an average delay, a delay spread, a spatial receive parameter, or any combination thereof.

16. The method of claim 13, wherein the determining the transmission configuration for the transmission of the downlink information comprises:
   determining a first transmission configuration indication (TCI) state associated with the first resource set.

17. An apparatus for communication, comprising:
   a processing circuit configured to:
      determine that a gap between a time of allocation of resources on a channel and a time of transmission of downlink information on the channel is smaller than a threshold,
      identify a resource set associated with the time of transmission of the downlink information, and
      acquire a transmission configuration of the resource set at an acquisition time that is based on the time of transmission of the downlink information on the channel; and
   a receiver configured to receive the downlink information on the channel based on the acquired transmission configuration.

18. The apparatus of claim 17, wherein the identification of the resource set comprises identifying a resource set used to decode control information that scheduled the transmission of the downlink information.

19. The apparatus of claim 18, wherein:
the resource set comprises a control resource set;
the transmission configuration comprises a transmission configuration indication that includes quasi co-location information;
the channel comprises a physical downlink shared channel; and
the control information comprises downlink control information.

20. The apparatus of claim 17, wherein:
the processing circuit is further configured to determine that the channel is semi-persistently scheduled.

21. The apparatus of claim 20, wherein:
the resource set comprises a control resource set;
the transmission configuration comprises a transmission configuration indication that includes quasi co-location information;
the channel comprises a physical downlink shared channel; and
the determination that the channel is semi-persistently scheduled comprises receiving downlink control information that indicates semi-persistent scheduling.

22. The apparatus of claim 17, wherein the processing circuit is further configured to:
select the resource set from a time slot allocated for the transmission of the downlink information.

23. The apparatus of claim 22, wherein the selected resource set is closer to the time of transmission of the downlink information than any other resource set in the time slot.

24. The apparatus of claim 17, wherein the resource set:
precedes the time of transmission of the downlink information; and
is closer to the time of transmission of the downlink information than any other resource set that precedes the time of transmission of the downlink information.

25. A method of communication for an apparatus, comprising:
determining that a gap between a time of allocation of resources on a channel and a time of transmission of downlink information on the channel is smaller than a threshold;
identifying a resource set associated with the time of transmission of the downlink information;
acquiring a transmission configuration of the resource set at an acquisition time that is based on the time of transmission of the downlink information on the channel; and
receiving the downlink information on the channel based on the acquired transmission configuration.

26. The method of claim 25, wherein the identifying the resource set comprises identifying a resource set used to decode control information that scheduled the transmission of the downlink information.

27. The method of claim 25, further comprising:
determining that the channel is semi-persistently scheduled.

28. The method of claim 25, wherein the identifying the resource set comprises:
identifying a time slot allocated for the transmission of the downlink information; and
selecting from the time slot a first resource set that is closer to the time of transmission of the downlink information than any other resource set in the time slot.

29. The method of claim 25, wherein the identifying the resource set comprises identifying a resource set that:
precedes the time of transmission of the downlink information; and
is closer to the time of transmission of the downlink information than any other resource set that precedes the time of transmission of the downlink information.

* * * * *